(12) United States Patent
Hwang et al.

(10) Patent No.: US 7,652,740 B2
(45) Date of Patent: Jan. 26, 2010

(54) ARRAY SUBSTRATE FOR LCD DEVICE HAVING DUAL METAL-LAYER GATE AND DATA LINES AND MANUFACTURING METHOD THEREOF

(75) Inventors: Yong-Sup Hwang, Suwon-si (KR); Gee-Sung Chae, Incheon (KR); Gyoo-Chul Jo, Gunpo-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/608,085

(22) Filed: Jun. 30, 2003

(65) Prior Publication Data

US 2004/0041958 A1  Mar. 4, 2004

(30) Foreign Application Priority Data

Sep. 3, 2002 (KR) ............ 10-2002-0052660

(51) Int. Cl.
  *G02F 1/1343* (2006.01)
  *G02F 1/1333* (2006.01)
(52) U.S. Cl. .............. 349/147; 349/138; 349/139; 349/148; 349/158; 349/187
(58) Field of Classification Search ............... 349/39, 349/42, 43, 46, 139, 147, 122, 138, 148, 349/158; 257/59, 72
See application file for complete search history.

(56) References Cited

U.S. PATENT DOCUMENTS

| | | | | |
|---|---|---|---|---|
| 5,650,834 A * | 7/1997 | Nakagawa et al. | ........... | 349/139 |
| 5,739,877 A * | 4/1998 | Onisawa et al. | ........... | 349/42 |
| 6,043,511 A * | 3/2000 | Kim | ........... | 257/59 |
| 6,091,464 A * | 7/2000 | Song | ........... | 349/38 |
| 6,184,964 B1 * | 2/2001 | Kameyama et al. | ........... | 349/147 |
| 6,335,211 B1 * | 1/2002 | Lee | ........... | 438/22 |
| 6,350,995 B1 * | 2/2002 | Sung et al. | ........... | 257/59 |
| 6,362,507 B1 * | 3/2002 | Ogawa et al. | ........... | 257/350 |
| 6,674,495 B1 * | 1/2004 | Hong et al. | ........... | 349/43 |
| 6,674,502 B1 * | 1/2004 | Terakado et al. | ........... | 349/147 |
| 6,750,475 B1 * | 6/2004 | Izumi et al. | ........... | 257/59 |
| 6,780,784 B2 * | 8/2004 | Jo et al. | ........... | 438/745 |
| 6,861,368 B2 * | 3/2005 | Chae | ........... | 438/738 |
| 2002/0057395 A1 * | 5/2002 | Chae et al. | ........... | 349/43 |

(Continued)

FOREIGN PATENT DOCUMENTS

JP       04-217322       8/1992

(Continued)

*Primary Examiner*—Andrew Schechter
(74) *Attorney, Agent, or Firm*—McKenna Long & Aldridge

(57) ABSTRACT

The present invention is an array substrate for use in a liquid crystal display device, which includes a first double-layered metal structure and a second double-layered metal structure. The first double-layered metal structure includes a gate electrode, a gate line and a gate pad electrode on a substrate, wherein all of the gate electrode, the gate line and the gate pad electrode have a first barrier metal layer and a first copper layer. The second double-layered metal structure includes a data line, source and drain electrodes, a capacitor electrode, and a data pad electrode, wherein all of the data line, the source and drain electrodes, the capacitor electrode and the data pad electrode have a second barrier metal layer and a second copper layer.

21 Claims, 23 Drawing Sheets

U.S. PATENT DOCUMENTS

| | | | |
|---|---|---|---|
| 2002/0070382 A1* | 6/2002 | Yamazaki et al. | 257/72 |
| 2002/0081847 A1* | 6/2002 | Jo et al. | 438/689 |
| 2002/0105604 A1* | 8/2002 | Ha et al. | 349/43 |
| 2002/0117691 A1* | 8/2002 | Choi et al. | 257/225 |
| 2002/0135710 A1* | 9/2002 | Chae | 349/43 |
| 2003/0127649 A1* | 7/2003 | Chae | 257/72 |
| 2003/0169380 A1* | 9/2003 | Arao | 349/43 |
| 2003/0178656 A1* | 9/2003 | Kwon et al. | 257/288 |
| 2003/0213966 A1* | 11/2003 | Yang et al. | 257/93 |

FOREIGN PATENT DOCUMENTS

| | | |
|---|---|---|
| JP | 06-194689 | 7/1994 |
| JP | 06-235297 | 8/1994 |
| JP | 06-265937 | 9/1994 |
| JP | 06-267986 | 9/1994 |
| JP | 08-018058 | 1/1996 |
| JP | 08-179362 | 7/1996 |
| JP | 10-096949 | 4/1998 |
| JP | 10-142630 | 5/1998 |
| JP | 10-221702 | 8/1998 |
| JP | 10-253976 | 9/1998 |
| JP | 11-052416 | 2/1999 |
| JP | 2001-059191 | 3/2001 |
| JP | 2002-057338 | 2/2002 |
| KR | 10-2001-0057663 | 7/2001 |

* cited by examiner

ARRAY SUBSTRATE FOR LCD DEVICE HAVING DUAL METAL-LAYER GATE AND DATA LINES AND MANUFACTURING METHOD THEREOF

The present invention claims the benefit of Korean Patent Application No. 2002-0052660, filed in Korea on Sep. 3, 2002, which is hereby incorporated by reference for all purposes as if fully set forth herein.

BACKGROUND OF THE INVENTION

1. Field of the Invention

The present invention relates to a liquid crystal display (LCD) device, and more particularly, to an array substrate having gate and data lines with a double-layered structure.

2. Discussion of the Related Art

In general, since flat panel display devices are thin, low weight, and have low power consumption, they are increasingly being used for displays for portable devices. Among the various types of flat panel display devices, liquid crystal display (LCD) devices are widely used for laptop computers and desktop monitors because of their superiority in resolution, color image display, and display quality.

LCD devices use the optical anisotropy and polarization properties of liquid crystal molecules to produce a desired image. Liquid crystal molecules have a definite intermolecular orientation that results from their peculiar characteristics. The specific orientation can be modified by an electric field that is applied across the liquid crystal molecules. In other words, electric fields applied across the liquid crystal molecules can change the orientation of the liquid crystal molecules. Due to optical anisotropy, incident light is refracted according to the orientation of the liquid crystal molecules.

Specifically, the LCD devices have upper and lower substrates with electrodes that are spaced apart and face each other, and a liquid crystal material is interposed therebetween. Accordingly, when a voltage is applied to the liquid crystal material by the electrodes of each substrate, an alignment direction of the liquid crystal molecules is changed in accordance with the applied voltage to display images. By controlling the applied voltage, the LCD device provides various transmittances for rays of light to display image data.

The liquid crystal display (LCD) devices have wide application in office automation (OA) and video equipment because of their light weight, thin design, and low power consumption characteristics. Among the different types of LCD devices, active matrix LCDs (AM-LCDs), which have thin film transistors and pixel electrodes arranged in a matrix form, offer high resolution and superiority in displaying moving images. A typical LCD panel has an upper substrate, a lower substrate and a liquid crystal material layer interposed therebetween. The upper substrate, commonly referred to as a color filter substrate, includes a common electrode and color filters. The lower substrate, commonly referred to as an array substrate, includes switching elements, such as thin film transistors (TFT's), and pixel electrodes, for example.

As previously described, operation of an LCD device is based on the principle that the alignment direction of the liquid crystal molecules is dependent upon an applied electric field between the common electrode and the pixel electrode. Accordingly, the liquid crystal molecules function as an optical modulation element having variable optical characteristics that depend upon polarity of the applied voltage.

As shown in FIG. 1, gate lines 33 are disposed in a transverse direction and data lines 53 are disposed in a longitudinal direction. The data lines 53 perpendicularly cross the gate lines 33 such that the crossing of the gate and data lines 33 and 53 defines a matrix of pixel regions P. A switching device such as a thin film transistor T is disposed in each pixel region P near a crossing of the gate and data lines 33 and 53. A gate pad electrode 35 is formed at the end of each gate line 33. This gate pad electrode 35 has a wider width than the gate line 33. A data pad electrode 55 is formed at the end of each data line 53, and similarly has a wider width than the data line 53. On each gate pad electrode 35, a gate pad terminal 71 is formed of a transparent, electrically conductive material. A data pad terminal 73 of transparent conductive material is likewise formed on each data pad electrode 55. The gate and data pad terminals 71 and 73 receive electrical signals by way of the external driving circuits.

In each pixel region P, a pixel electrode 69 is disposed so as to come into contact with the thin film transistor T. A storage capacitor C is also formed in a portion of each pixel region P. In each pixel region P in this example, the storage capacitor C is formed over the gate line 33 and is connected in parallel with the pixel electrode 69.

Each thin film transistor T includes a gate electrode 31 extending from the gate line 33, an active layer 39 formed of silicon, a source electrode 49 extending from the data line 53, and a drain electrode 51 contacting the pixel electrode 69. Meanwhile, the storage capacitor C includes a portion of the gate line 33 as a first electrode, a capacitor electrode 57 as a second electrode, and an insulator (not shown) disposed therebetween. The capacitor electrode 57 is formed of the same material as the source and drain electrodes 49 and 51 and communicates with the pixel electrode 69 through a storage contact hole 63.

In the related art shown in FIG. 1, the gate electrode 31 and the gate line 33 are generally formed of aluminum or aluminum alloy in order to prevent signal delay. Alternatively, the gate electrode 31 and the gate line 33 can be formed of a double-layer of an aluminum layer that can be formed of an aluminum alloy layer and an additional metal layer because the aluminum and aluminum alloy are weak at acid during the process. Furthermore, all of the source electrode 49, the drain electrode 51, the data line 53 and the data pad electrode 55 can also be formed of aluminum or aluminum alloy. At this time, an additional metal layer is also formed on the aluminum or aluminum alloy layer.

Now with reference to FIGS. 2A-2J and FIGS. 3A-3J, fabrication process steps of forming an array substrate will be explained in detail according to a related art. FIGS. 2A to 2J are cross sectional views taken along a line II-II' of FIG. 1 and illustrates a process of forming a pixel according to the related art. FIGS. 3A to 3J are cross sectional views taken along a line III-III' of FIG. 1 and illustrates a process of forming pads according to the related art. In the process shown in FIGS. 2A-2J and FIGS. 3A-3J, the gate line, the gate electrode and the gate pad electrode have a double-layered structure including aluminum. The aluminum in the gate line reduces the RC delay because it has a low resistance. However, aluminum is delicate to acidity and susceptible to developing hillocks during a high temperature manufacturing or patterning process, possibly resulting in line defects. For this reason, molybdenum or chromium is formed on the aluminum or aluminum alloy, thereby forming the double-layered structure as follows.

Referring to FIGS. 2A and 3A, aluminum (Al) or aluminum neodymium (AlNd) is deposited on a substrate 21, thereby forming a first metal layer 23a. Then, molybdenum is deposited on the first metal layer 23a, and thus a second metal layer 23b is formed. Thereafter, a photoresist layer 25 is formed on the second metal layer 23b of molybdenum. After forming the photoresist layer 25, a mask M having light-transmitting portions A and light-shielding portions B is disposed over the photoresist 25, and then a light exposure is performed to the photoresist 25. Thereafter, the photoresist 25 is developed to form a photoresist pattern on the double layer of first and second metal layers 23a and 23b.

In FIGS. 2B and 3B, after developing the photoresist 25, photoresist patterns 27 remain and the second metal layer 23b is exposed. Thereafter, the substrate 21 having the photoresist patterns 27 is baked in an oven to form the semicircular shape as shown in FIGS. 2B and 3B.

Now referring to FIGS. 2C and 3C, the exposed portions of the second metal layer 23b and the underlay first metal layer 23a are etched under a wet etching process. Therefore, first and second metal patterns 29a and 29b are formed underneath the photoresist patterns 27. During the wet etching process, since the first metal layer 23a of aluminum or aluminum alloy is etched faster than the second metal layer 23b of molybdenum by the etching solution, the second metal patterns 29b overhang on the first metal patterns 29a, as shown in FIGS. 2C and 3C. This overhang phenomenon of the second metal patterns 29b causes the later-formed insulator to have deposition defects. Namely, if the insulator (not shown) is formed in a later step to cover the first and second metal patterns 29a and 29b of FIGS. 2C and 3C, the insulator may have defects caused by the overhanging brims of the second metal patterns 29b.

To overcome this problem, an additional dry etch of the first and second metal patterns 29a and 29b is required. FIGS. 2D and 3D show the photoresist patterns 27, the first metal patterns 29a and the second metal patterns 29b after the dry etching process. The dry etch slightly removes and laminates the side portions of the photoresist patterns 27 and the side portions of the first and second metal patterns 29a and 29b. Therefore, the first and second patterns 29a and 29b have a smooth taper shape without any steps or overhangs on their sides.

After the dry etch process, the photoresist patterns 27 are stripped away as shown in FIGS. 2E and 3E. Therefore, the gate electrode 31, the gate line 33 and the gate pad electrode 35 are formed to have a double-layered structure of aluminum or aluminum alloy and molybdenum. As described in FIG. 1, the gate electrode 31 extends from the gate line 33 and the gate pad electrode 35 is at the end of the gate line 33.

Now referring to FIGS. 2F and 3F, a gate insulation layer 37 is formed on the substrate 21 to cover the double-layered gate electrode 31, line 33 and pad electrode 35. The gate insulation layer 37 is an inorganic material, such as silicon nitride ($SiN_x$) or silicon oxide ($SiO_2$). Thereafter, amorphous silicon (a-Si:H) and n+ doped amorphous silicon (n+a-Si:H) are sequentially formed on the gate insulation layer 37 and then patterned to form an active layer 39 and an ohmic contact layer 41 over the gate electrode 31.

Next in FIGS. 2G and 3G, third to fifth metal layers 43, 45 and 47 are sequentially formed on the gate insulation layer 37 to cover both the active layer 37 and the ohmic contact layer 41. Here, the third and fifth metal layers 43 and 47 are molybdenum (Mo) and the fourth metal layer 45 interposed therebetween is aluminum (Al). Therefore, the triple-layered structure of Mo/Al/Mo is disposed on the gate insulation layer 37.

Thereafter, the third to fifth metal layers 43, 45 and 47 are simultaneously patterned as shown in FIGS. 2H and 3H. Thus, a source electrode 49, a drain electrode 51, a data line 53, a data pad electrode 55 and a capacitor electrode 57, all of which have the triple-layered structure, are formed over the substrate 21. The source electrode 49 extends from the data line 53 and contacts the ohmic contact layer 41. The drain electrode 51 is spaced apart from the source electrode 49 and also contacts the ohmic contact layer 41. As mentioned with reference to FIG. 1, the data pad electrode 55 is at the end of the data line 53, and the capacitor electrode 57 is shaped like an island and disposed above the double-layered gate line 33.

After forming the source and drain electrodes 49 and 51, a portion of the ohmic contact layer 41 between the source and drain electrodes 49 and 51 is removed to form a channel region.

Meanwhile, the source and drain electrodes 49 and 51 and the data line 53 can be formed of a single layer of molybdenum or chromium. However, doing so may result in signal delay in those electrodes and ion the data line such that it is hard to obtain uniform image quality all over the liquid crystal panel.

In contrast, when the source and drain electrodes 49 and 51 and the data line 53 include metal having a low resistance, such as aluminum, the electrical signals flow without the signal delay such that the array substrate can be fabricated in a large size. Therefore, the source and drain electrodes 49 and 51 and the data lines 53 herein include the aluminum layer therein. Further, when aluminum is used for the source and drain electrodes 49 and 51, the molybdenum layers are formed on both upper and lower surfaces of the aluminum layer. The third metal of molybdenum formed underneath the aluminum layer acts to prevent a spiking phenomenon in which the aluminum layer penetrates into the active layer 39 or the ohmic contact layer 41. The fifth metal of molybdenum formed on the aluminum layer acts to reduce contact resistance between the aluminum layer and a later-formed transparent electrode. For these reasons, the source and drain electrodes 49 and 51 and the data line 53 are formed to have the triple-layered structure of Mo/Al/Mo.

Now in FIGS. 2I and 3I, a passivation layer 59, which is an insulation material, is formed all over the substrate 21. The passivation layer 59 covers the source and drain electrodes 49 and 51, the data line 53, the data pad electrode 55 and the storage capacitor 57. By patterning the passivation layer 59, a drain contact hole 61, a storage contact hole 63, a gate pad contact hole 65, and a data pad contact hole 67 are formed. The drain contact hole 61 exposes a portion of the drain electrode, the storage contact hole 63 exposes a portion of the capacitor electrode 57, the gate pad contact hole 65 exposes a portion of the gate pad 35, and the data pad contact hole 67 exposes a portion of the data pad 55.

In FIGS. 2J and 3J, a transparent conductive material is deposited on the passivation layer 59 having the above-mentioned holes, and then this transparent conductive material is patterned to form a pixel electrode 69, a gate pad terminal 71 and a data pad terminal 73. The transparent conductive material is one of indium tin oxide (ITO) and indium zinc oxide (IZO). The pixel electrode 69 contacts the drain electrode 51 and the capacitor electrode 57 through the drain contact hole 61 and storage contact hole 63, respectively. Further, the gate pad terminal 71 contacts the gate pad 35 through the gate pad contact hole 65, and the data pad terminal 73 contacts the data pad 55 through the data pad contact hole 67. Accordingly, the array substrate of the related art is complete.

The above-mentioned process includes five mask processes. Further, the gate electrode 31 and the gate line 33 need to undergo the double-etching process (the wet etching process and the dry etching process). Therefore, the method of forming the array substrate according to the related art requires a lot of process time.

In the related art shown in FIGS. 2A-2J and 3A-3J, the source and drain electrodes 49 and 51, the data line 53 and the data pad electrode 55, all of which have the triple-layered structure, are formed by an etching solution that simultaneously etches aluminum and molybdenum. Thus, an electrochemical reaction, such as a Galvanic Reaction, will be caused by the etching solution during this etching process. As the molybdenum layer becomes thicker, it is much difficult to overcome the electrochemical reaction. During the etching process of patterning the third to fifth metal layers, the molybdenum layers disposed on the upper and lower surfaces of the aluminum layer are overetched. Especially, when the third molybdenum layer underlying the fourth aluminum layer is overly etched, the fourth aluminum layer collapses and contacts the active layer in the thin film transistor. The connection between the aluminum layer and the active layer will increase the leakage current and deteriorate the operating characteristics of the thin film transistor.

FIG. 4 is an enlarged cross-sectional view of a portion D of FIG. 2J and illustrates an overetching in the third and fifth metal layers of the drain electrode. As shown, the molybdenum layers 43 and 47 are overetched rather than the aluminum layer 45. This phenomenon of overetching also occurs in the source electrode 51, the data line 53 and the data pad electrode 55. The overetching of the molybdenum layers 43 and 47 causes the passivation layer 59 to not be formed properly over the substrate 21. Furthermore, the overetching of the molybdenum layer 43 causes the aluminum layer 45 to contact the active layer 39 and/or the ohmic contact layer 41 because the aluminum layer 45 is pressed by the passivation layer 59, thereby increasing the leakage current in the thin film transistor. The increase of the OFF current deteriorates the electrical characteristics of the thin film transistor.

SUMMARY OF THE INVENTION

Accordingly, the present invention is directed to an array substrate for a liquid crystal display (LCD) device, that substantially obviates one or more of problems due to limitations and disadvantages of the related art.

An advantage of the present invention is to provide an array substrate for a liquid crystal display device, which has a reduced leakage current in thin film transistors.

Another advantage of the present invention is to provide an array substrate for a liquid crystal display device that simplifies the manufacturing process and increases the manufacturing yield.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for use in a liquid crystal display device includes a gate electrode, a gate line and a gate pad electrode on a substrate, wherein all of the gate electrode, the gate line and the gate pad electrode have a double-layered structure including a first barrier metal layer and a first copper layer; a gate insulation layer on the substrate covering the double-layered gate electrode, gate line and gate pad; an active layer and an ohmic contact layer sequentially formed on the gate insulation layer and over the gate electrode; a data line on the gate insulation layer crossing the gate line, source and drain electrodes contacting the ohmic contact layer, and a data pad electrode on the gate insulation layer, wherein all of the data line, the source and drain electrodes, and the data pad electrode have a double-layered structure including a second barrier metal layer and a second copper layer; a passivation layer formed on the gate insulation layer to cover the double-layered data line, source and drain electrodes, and data pad electrode, wherein the passivation layer has a drain contact hole exposing the drain electrode, a gate pad contact hole exposing the gate pad electrode, and a data pad contact hole exposing the data pad; and a pixel electrode, a gate pad terminal and a data pad terminal all of which are formed of a transparent conductive material on the passivation layer.

In another aspect, a method of forming an array substrate for use in a liquid crystal display device includes: forming a gate electrode, a gate line and a gate pad electrode on a substrate, wherein all of the gate electrode, the gate line and the gate pad electrode have a double-layered structure including a first barrier metal layer and a first copper layer; forming a gate insulation layer on the substrate to cover the double-layered gate electrode, gate line and gate pad; forming an active layer and an ohmic contact layer sequentially on the gate insulation layer and over the gate electrode; forming a data line, source and drain electrodes and a data pad electrode, wherein the data line is on the gate insulation layer to cross the gate line, wherein the source and drain electrodes contact the ohmic contact layer, wherein the data pad electrode is disposed on the gate insulation layer, and wherein all of the data line, the source and drain electrodes, the capacitor electrode and the data pad electrode have a double-layered structure including a second barrier metal layer and a second copper layer; forming a passivation layer formed on the gate insulation layer to cover the double-layered data line, source and drain electrodes, and data pad electrode, wherein the passivation layer has a drain contact hole exposing the drain electrode, a gate pad contact hole exposing the gate pad electrode, and a data pad contact hole exposing the data pad; and forming a pixel electrode, a gate pad terminal and a data pad terminal on the passivation layer using a transparent conductive material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, similar reference numbers will be used throughout the drawings to refer to the same or like parts.

Figure 1:
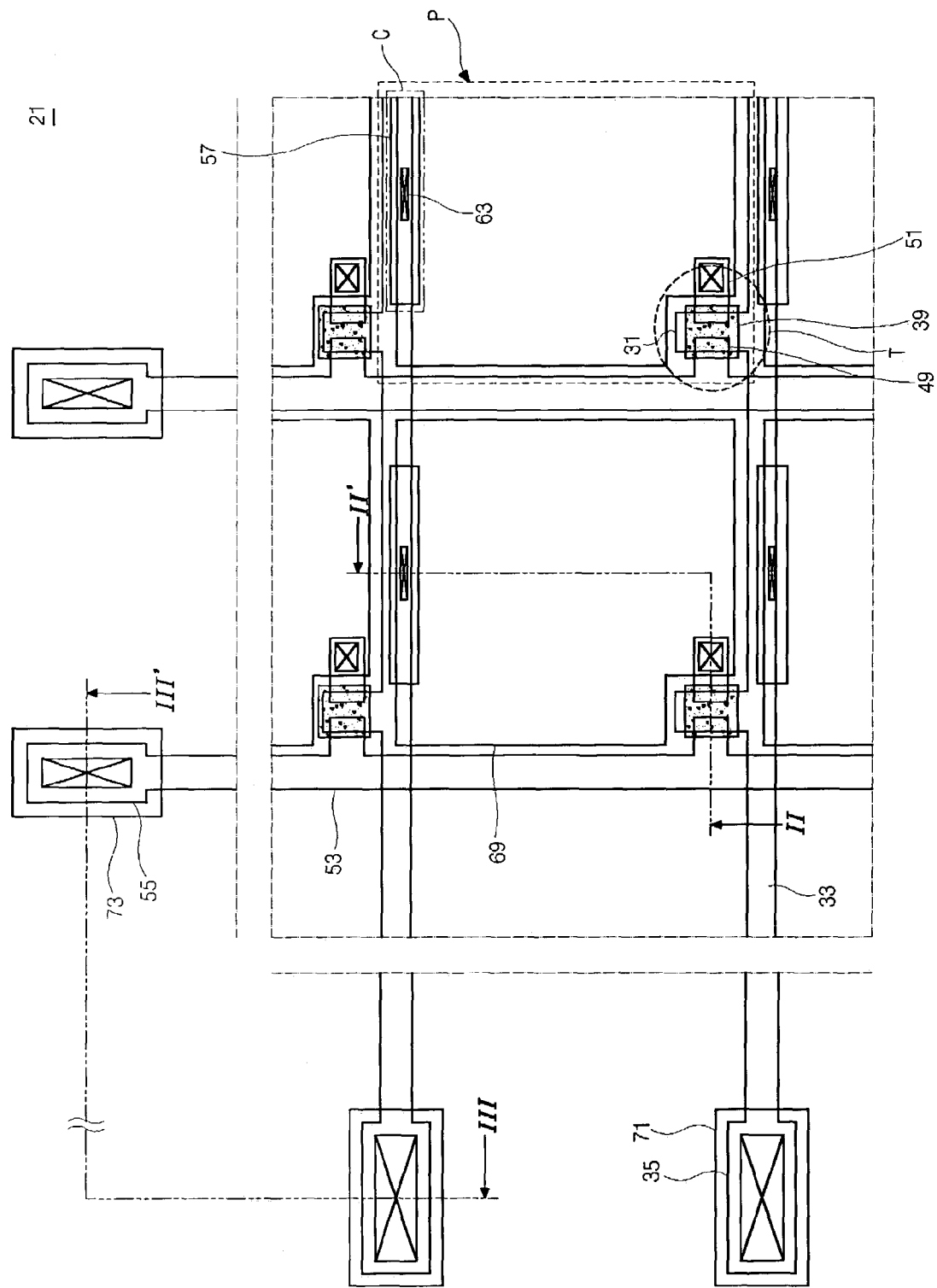
FIG. 1 is an enlarged plan view illustrating an array substrate according to a related art.

FIGS. 5A to 5I are cross sectional views illustrating a process of forming a pixel according to the present invention. And FIGS. 6A to 6I are cross sectional views illustrating a process of forming pads according to the present invention. In the present invention, it is distinguishable that gate, source and drain electrodes are double layers including a copper layer. Furthermore, the plan view of the present invention is similar to that of FIG. 1, so a separate such plan view is not included.

Figure 5A:
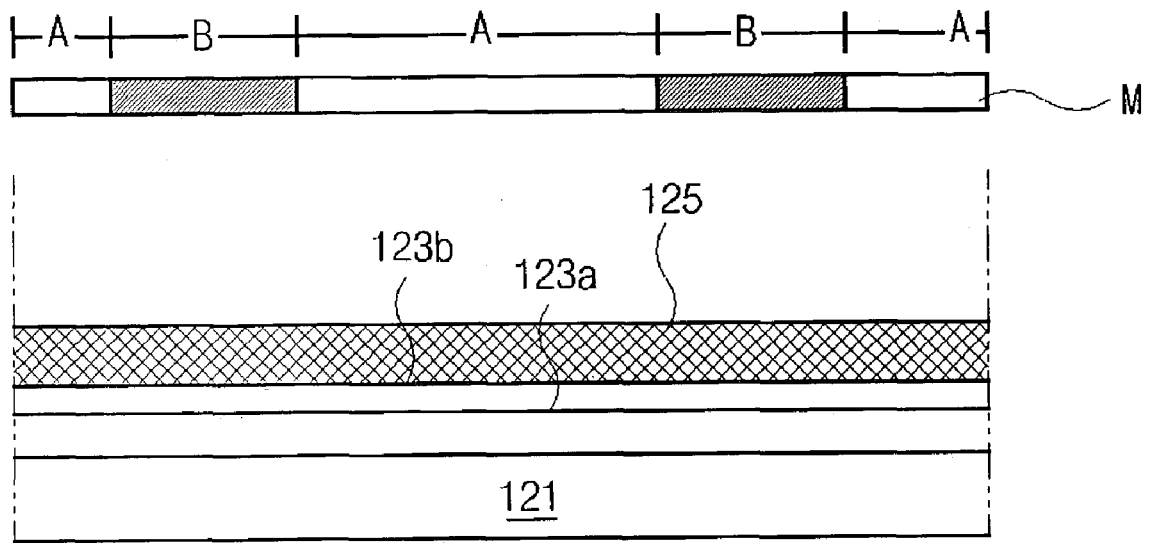
FIGS. 5A to 5I are cross sectional views illustrating a process of forming a pixel according to the present invention.
Figure 6A:
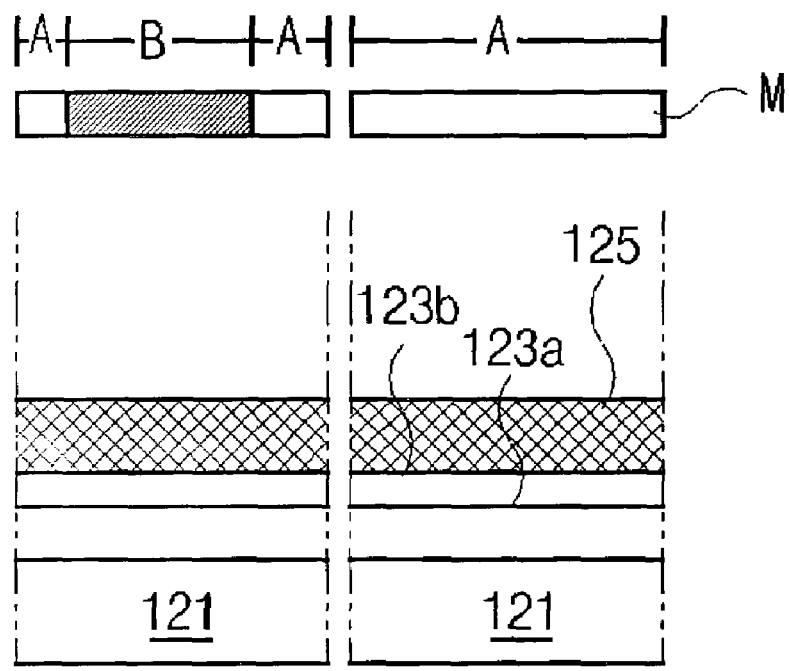
FIGS. 6A to 6I are cross sectional views illustrating a process of forming pads according to the present invention.

Referring to FIGS. 5A and 6A, a first metal layer 123a is formed on a substrate 121 and then a second metal layer 123b is formed on the first metal layer 123a. The first metal layer 123a may be one of tantalum (Ta), titanium (Ti), molybdenum (Mo), chromium (Cr), tungsten (W), nickel (Ni) or an alloy thereof. In the present invention, the second metal layer 123b is copper (Cu). The first metal layer 123a acts as a barrier metal that holds the second metal layer 123b to be attached to the substrate 121. Since the copper layer 123b does not have good adhesive characteristics with respect to the substrate 121, the barrier metal 123a is interposed between the substrate 121 and the copper layer 123b. Thereafter, a photoresist layer 125 is formed on the second metal layer 123b of copper. After forming the photoresist layer 125, a mask M having light-transmitting portions A and light-shielding portions B is disposed over the photoresist 125, and then a light exposure is performed to the photoresist 125.

Thereafter, the photoresist 125 is developed to form photoresist pattern on the double layers of first and second metal layers 123a and 123b.

Figure 5B:
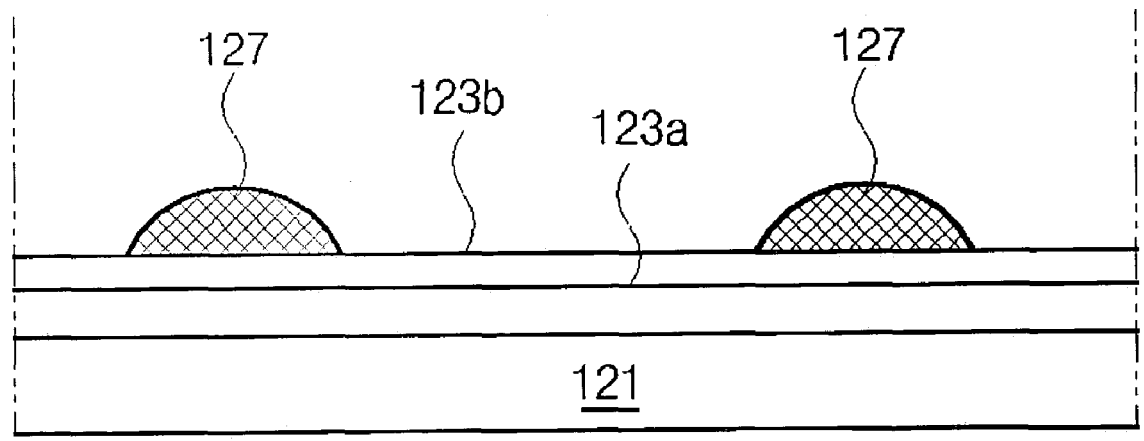
Figure 6B:
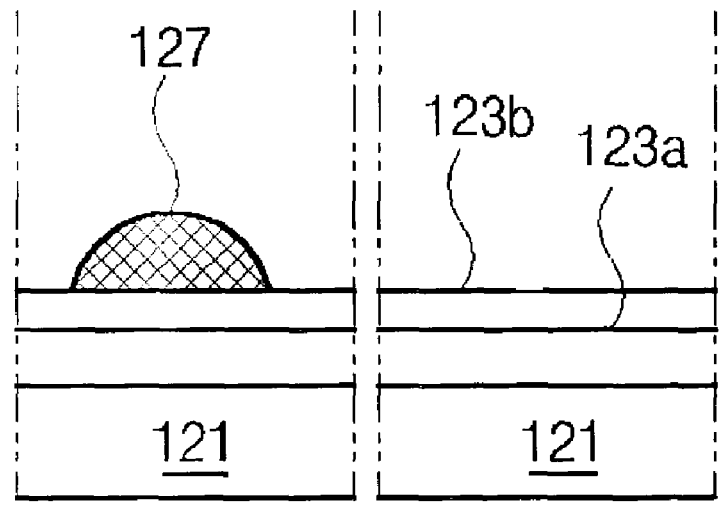

In FIGS. 5B and 6B, after developing the photoresist 125, photoresist patterns 127 remain on the second metal layer 123b. Then the second metal layer 123b is exposed. Thereafter, the substrate 121 having the photoresist patterns 127 is baked in an oven such that the photoresist patterns 127 have a semicircular shape as shown in FIGS. 5B and 6B.

Figure 2A:
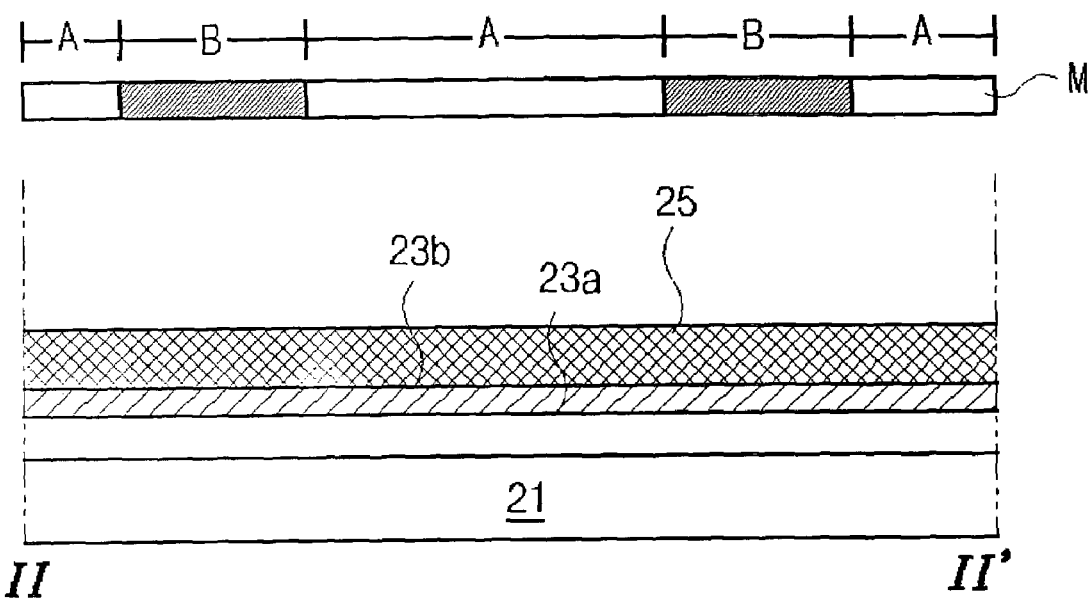
FIGS. 2A to 2J are cross sectional views taken along a line II-II' of FIG. 1 and illustrates a process of forming a pixel according to the related art.
Figure 2B:
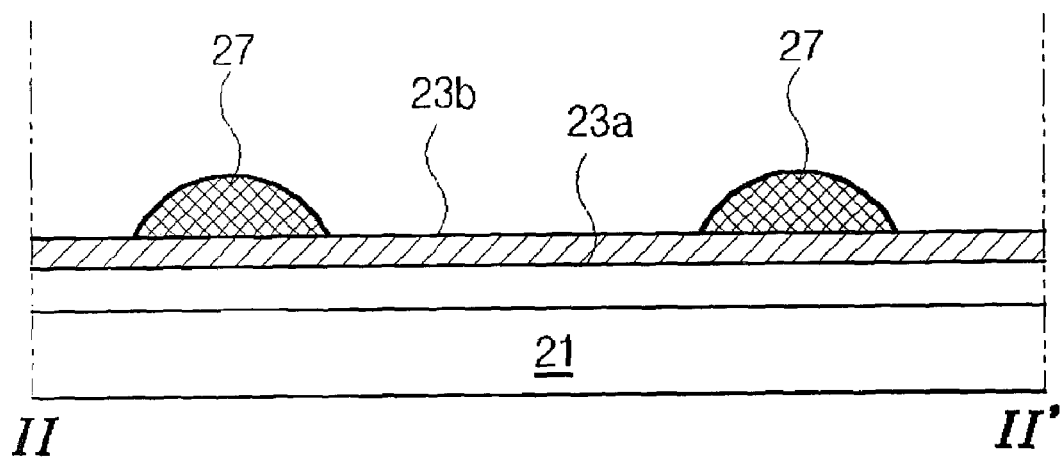
Figure 2C:
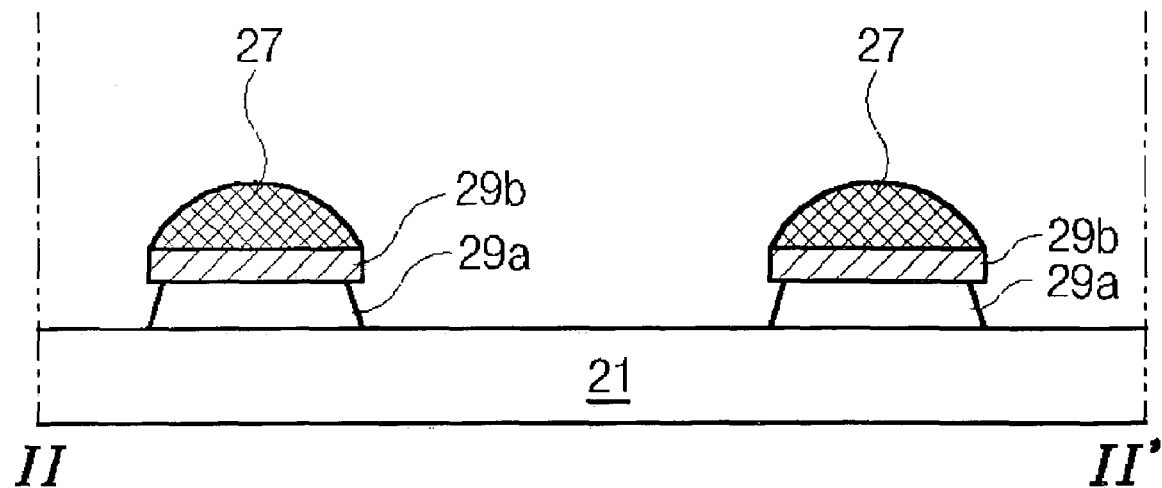
Figure 2D:
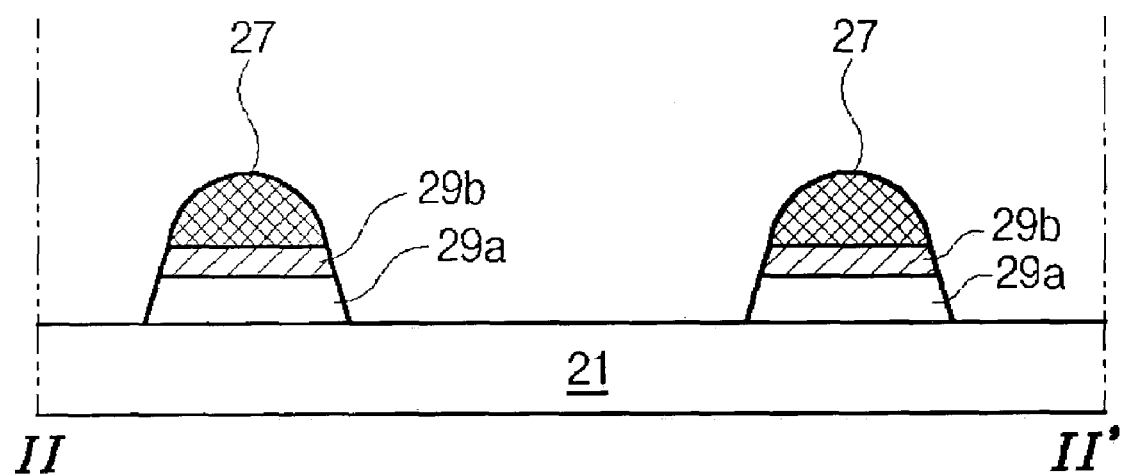
Figure 2E:
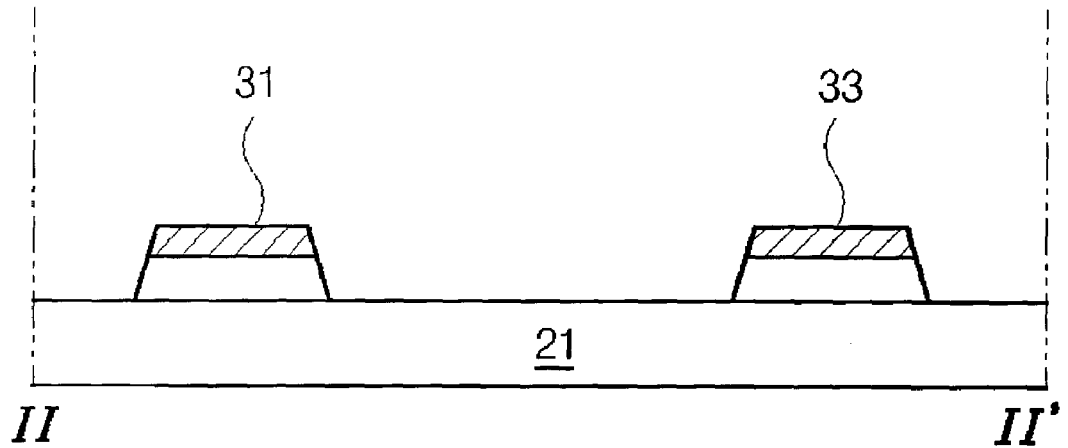
Figure 2F:
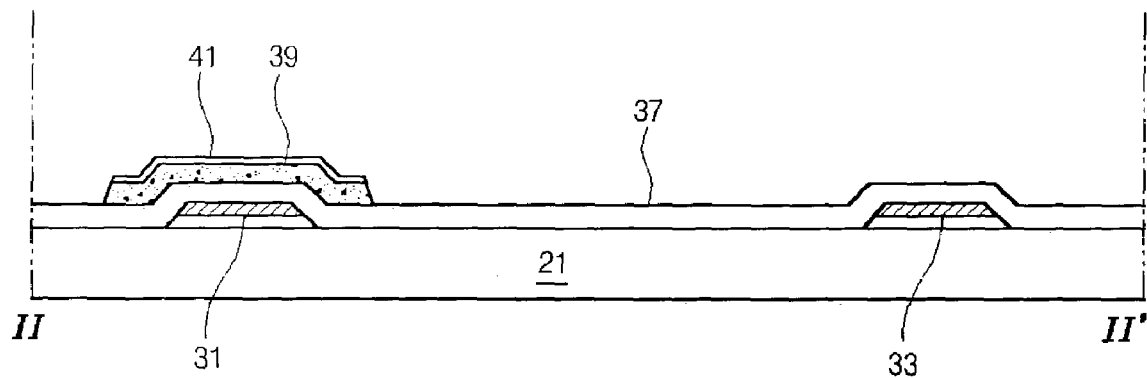
Figure 2G:
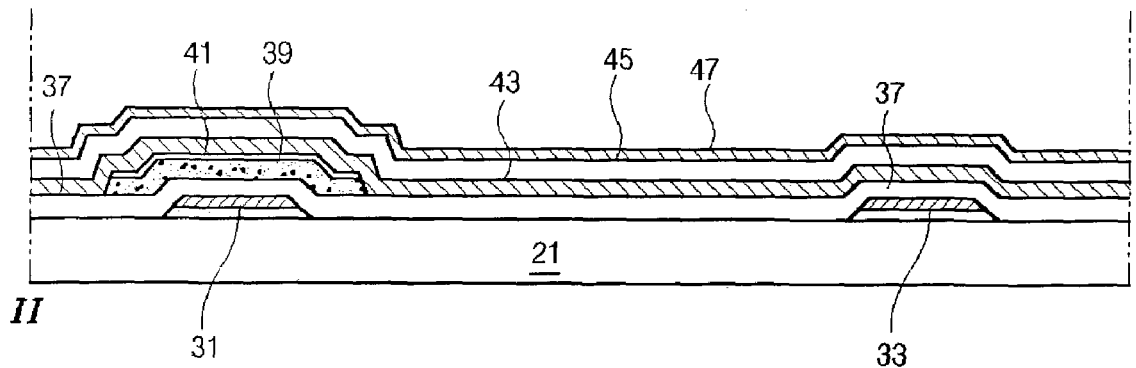
Figure 2H:
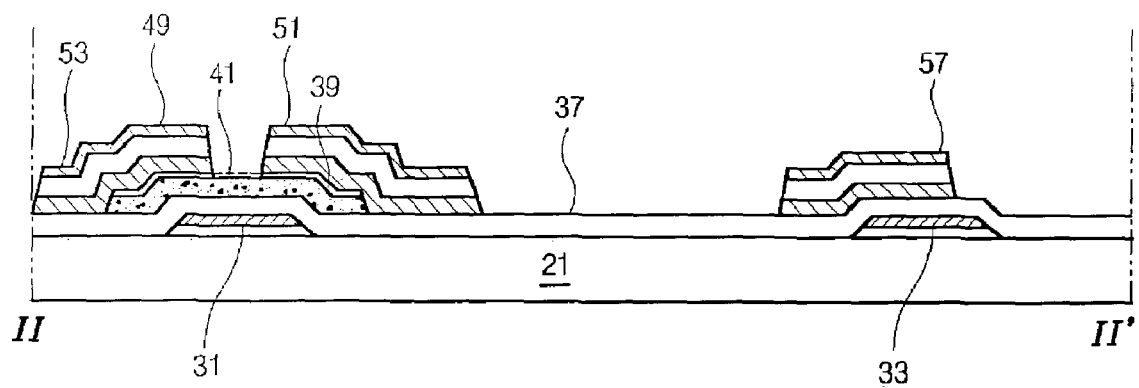
Figure 2I:
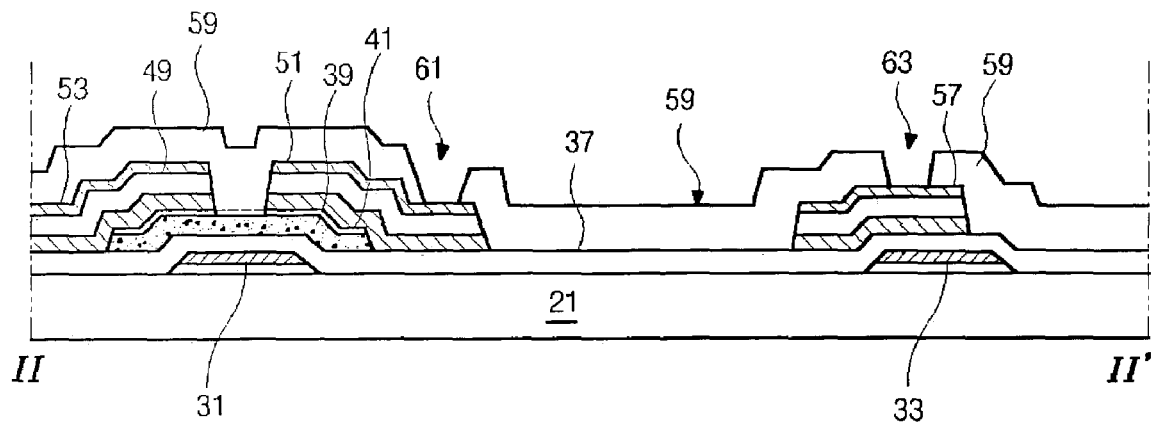
Figure 2J:
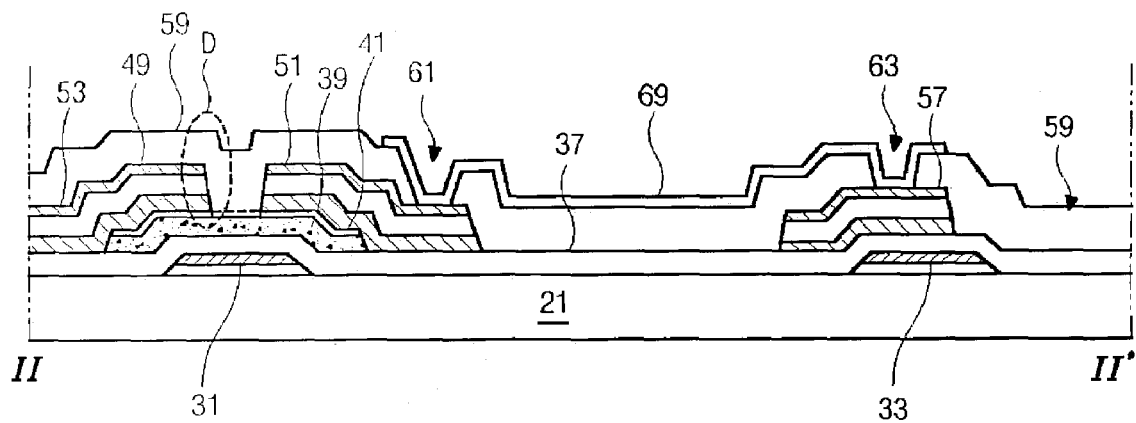
Figure 3A:
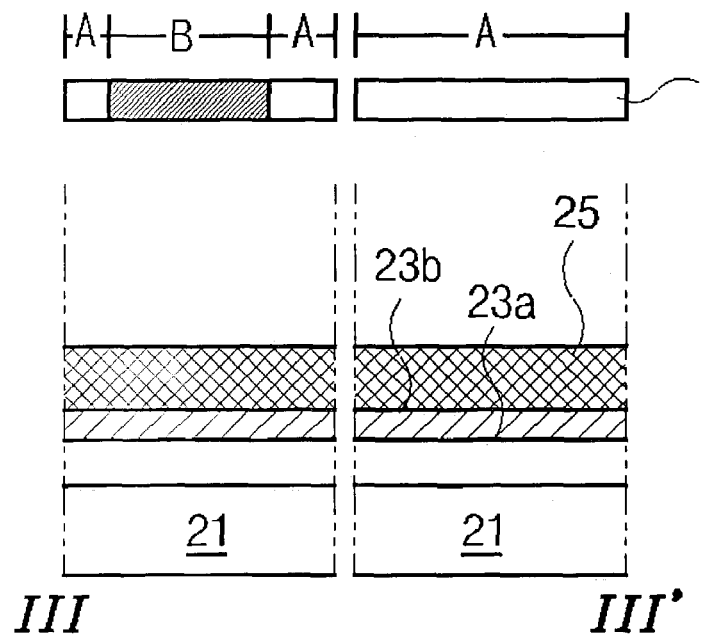
FIGS. 3A to 3J are cross sectional views taken along a line II-II' of FIG. 1 and illustrates a process of forming pads according to the related art.
Figure 3B:
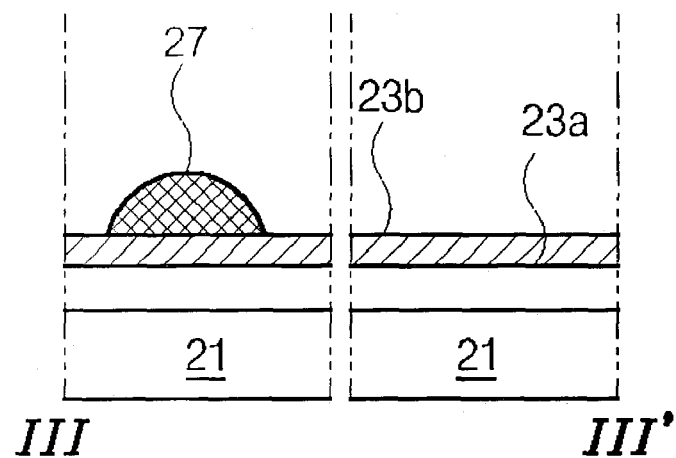
Figure 3C:
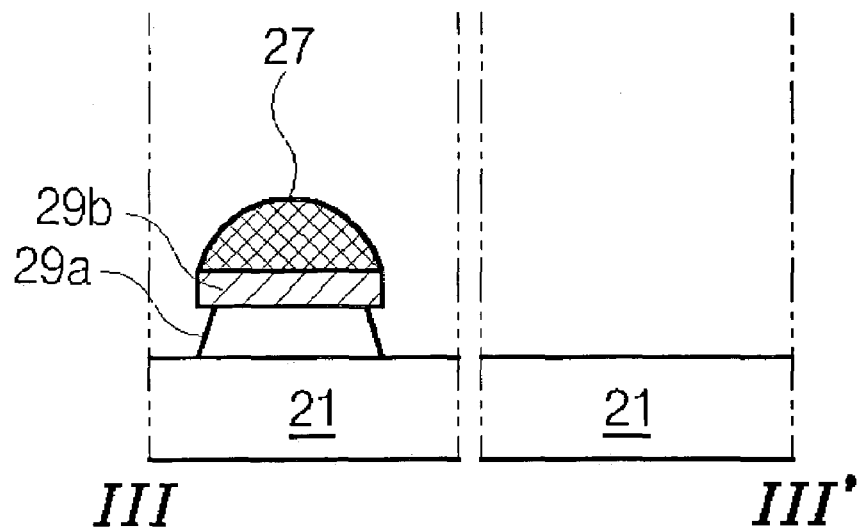
Figure 3D:
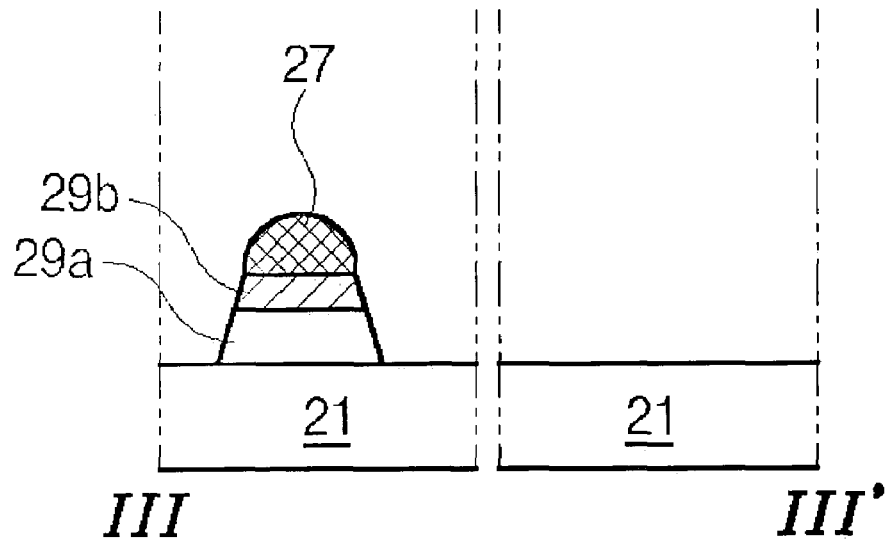
Figure 3E:
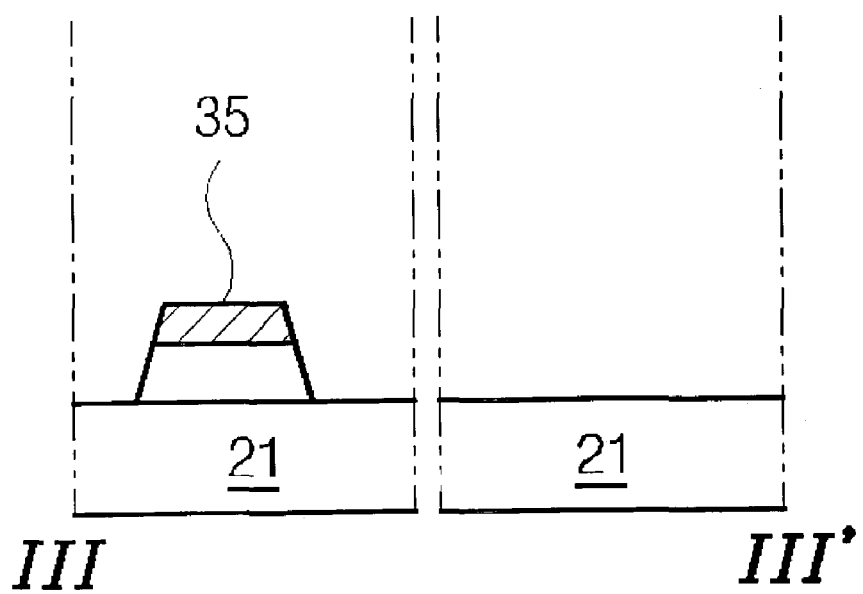
Figure 3F:
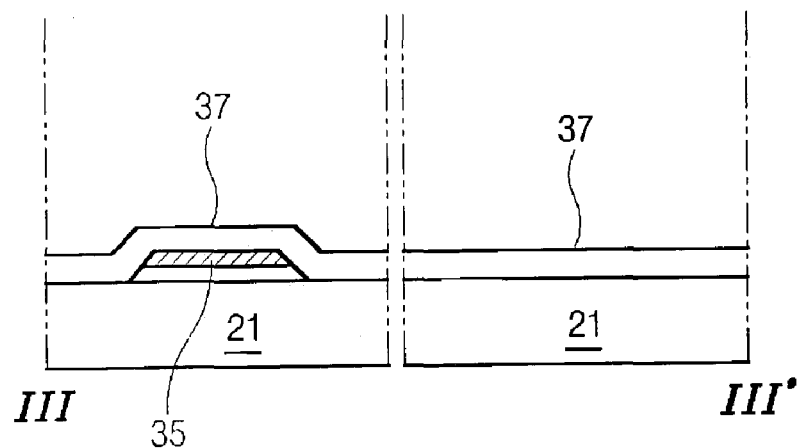
Figure 3G:
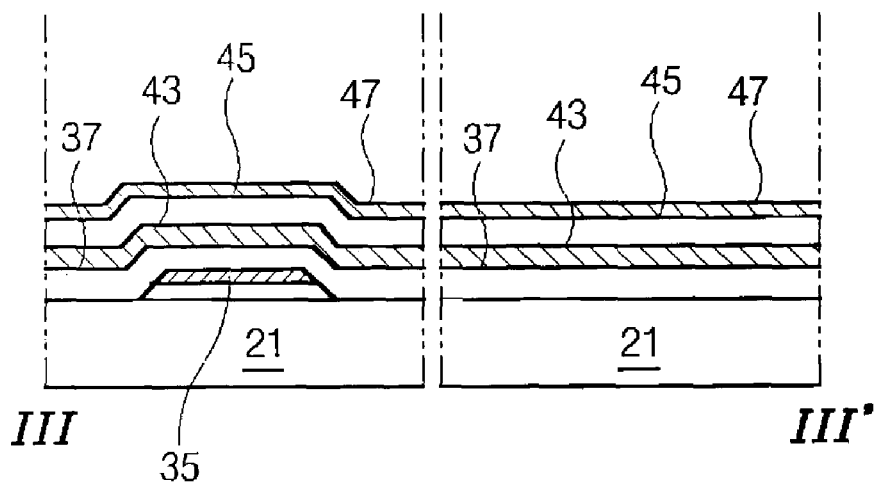
Figure 3H:
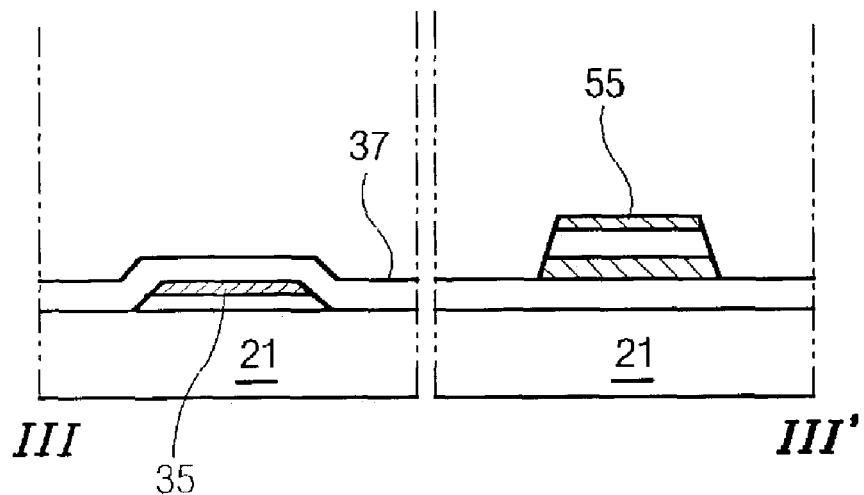
Figure 3I:
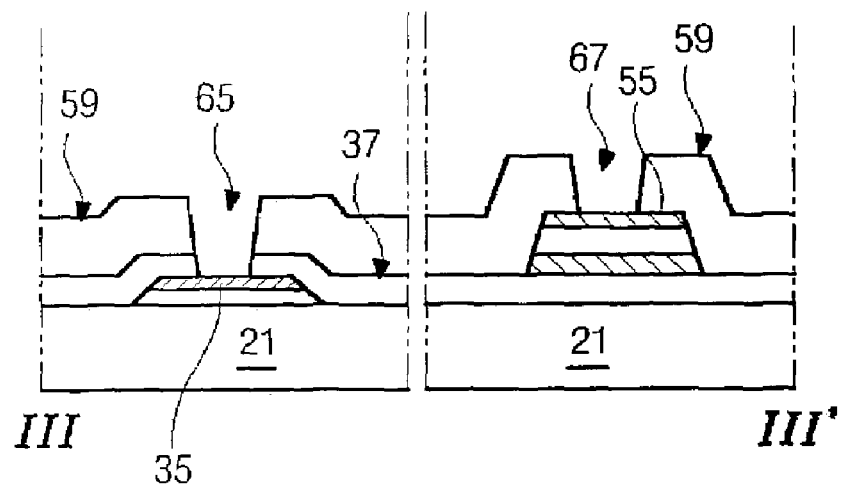
Figure 3J:
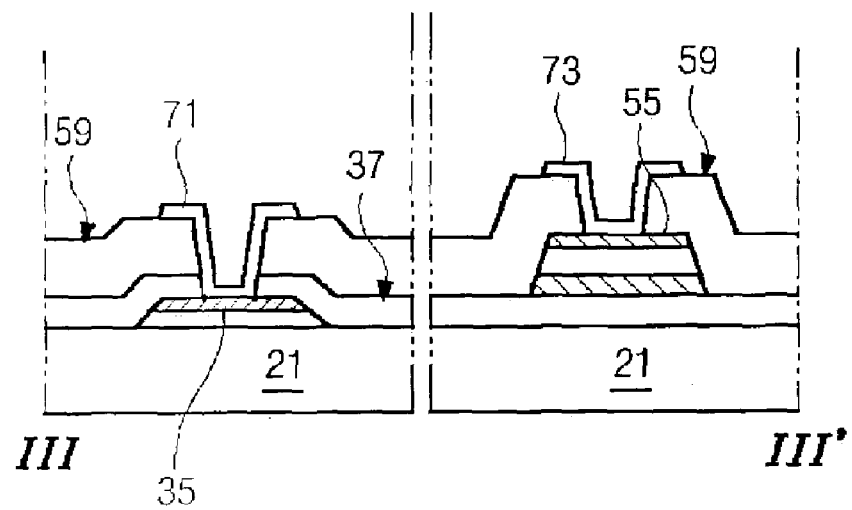
Figure 4:
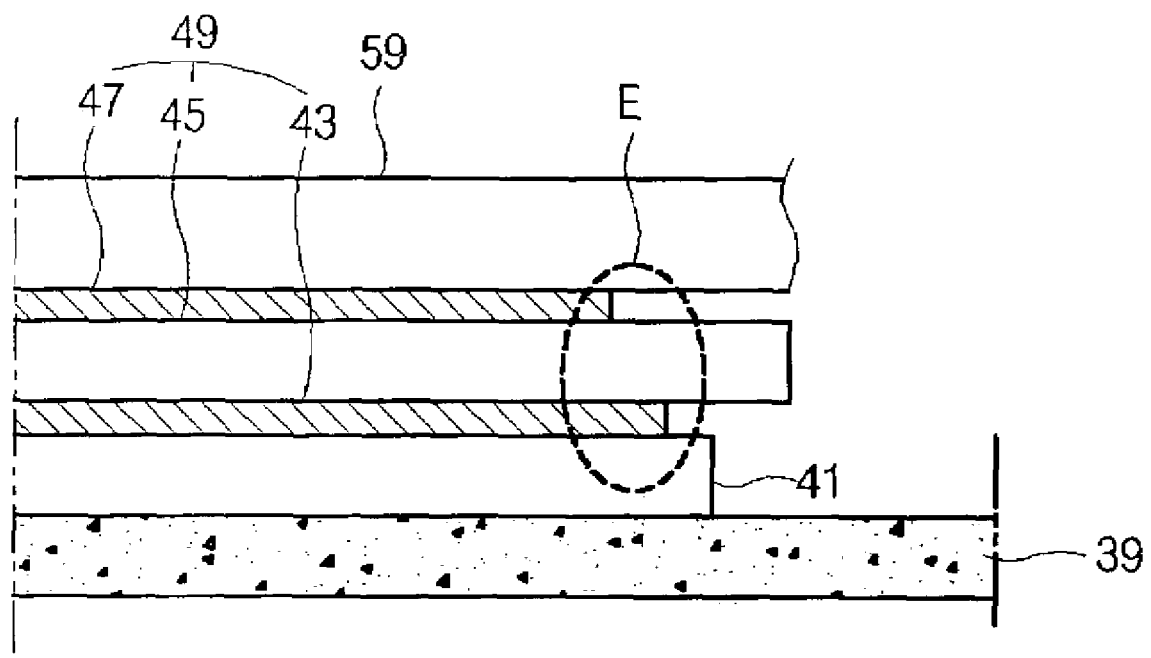
FIG. 4 is an enlarged cross-sectional view of a portion D of FIG. 2J and illustrates an overetching in the third and fifth metal layers of the drain electrode.
Figure 5C:
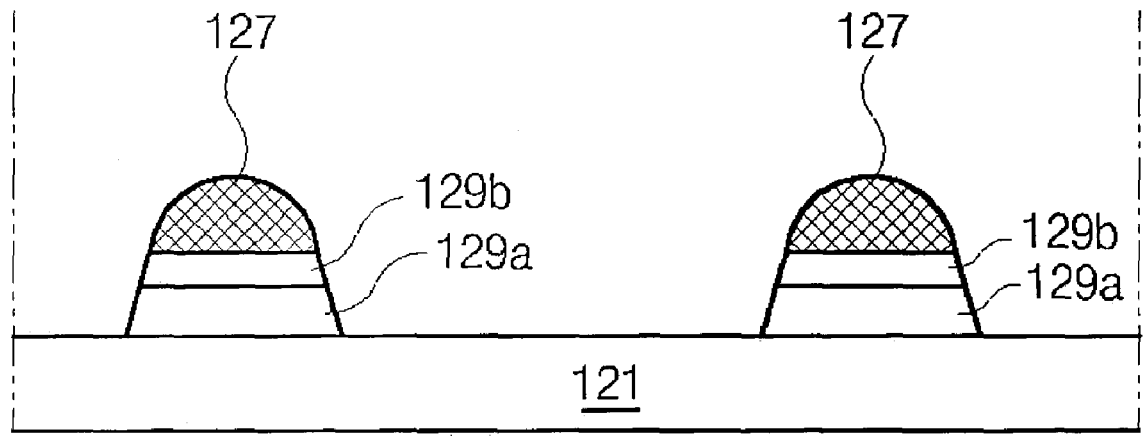
Figure 6C:
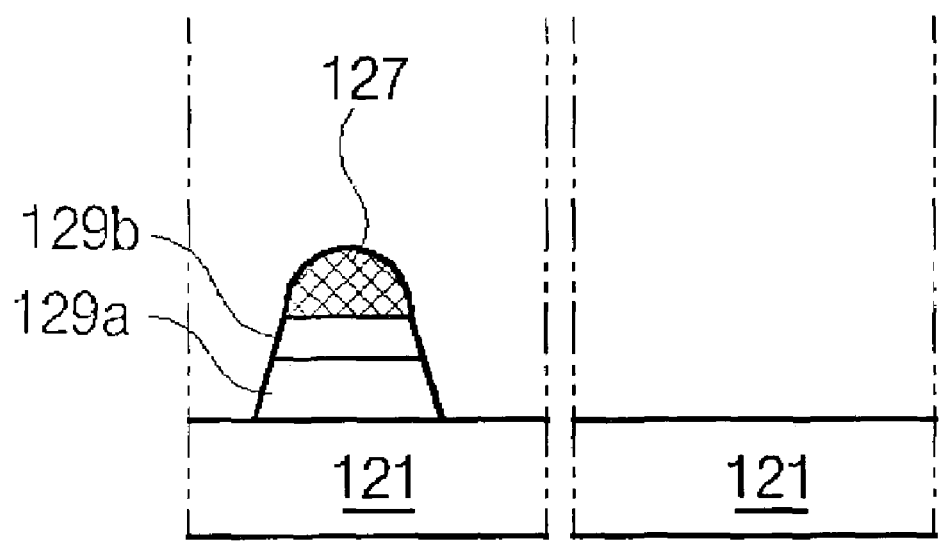

Now referring to FIGS. 5C and 6C, the exposed portions of the second metal layer 123b and the underlying first metal layer 123a are etched through a wet etching process. Therefore, first and second metal patterns 129a and 129b are formed underneath the photoresist patterns 127. In contrast to the related art shown in FIGS. 2C and 3C, the first and second metal patterns 129a and 129b have a smooth taper shape without any steps on their sides. That is because there is no aluminum in either the first or second metal layer.

Figure 5D:
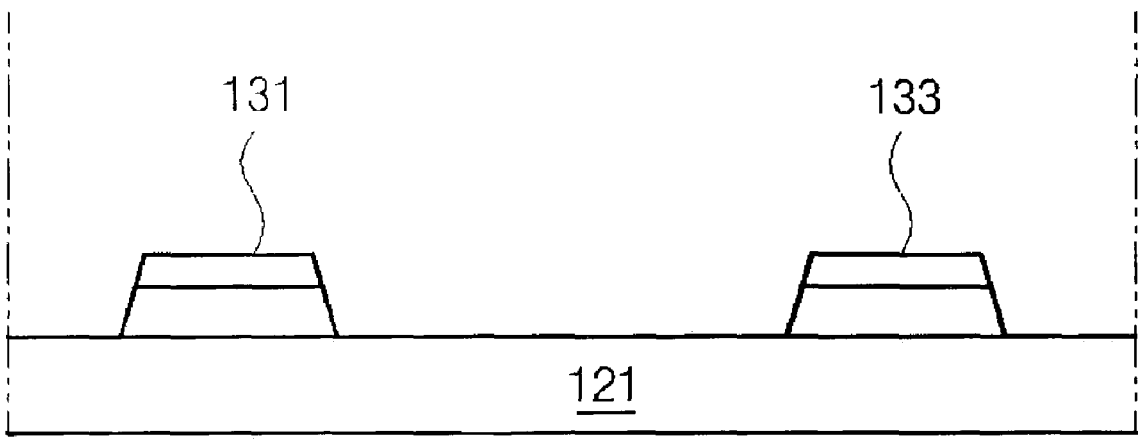
Figure 6D:
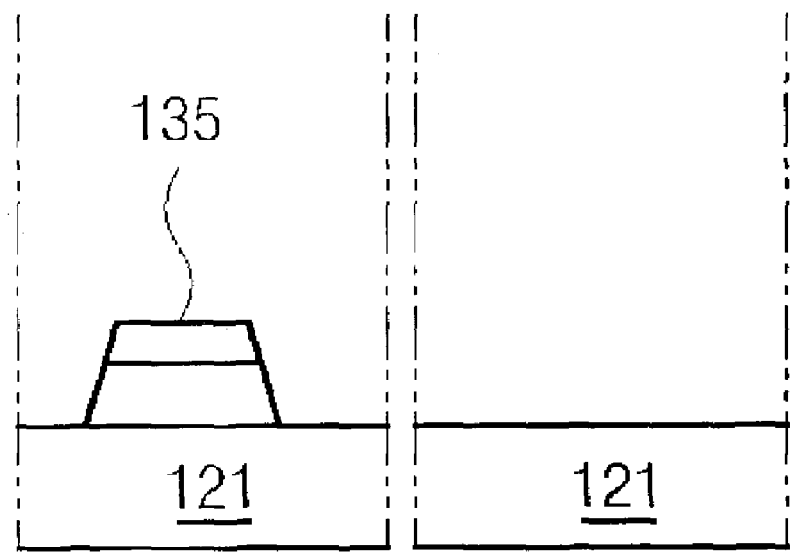

After the wet etch process, the photoresist patterns 127 are stripped away as shown in FIGS. 5D and 6D. Therefore, a gate electrode 131, a gate line 133 and a gate pad electrode 135 are formed to have a double-layered structure consisting of one of tantalum (Ta), titanium (Ti), molybdenum (Mo), chromium (Cr), tungsten (W), nickel (Ni) and an alloy thereof and the copper (Cu) layer. As described hereinbefore, the gate electrode 131 extends from the gate line 133, and the gate pad electrode 135 is at the end of the gate line 133.

Figure 5E:
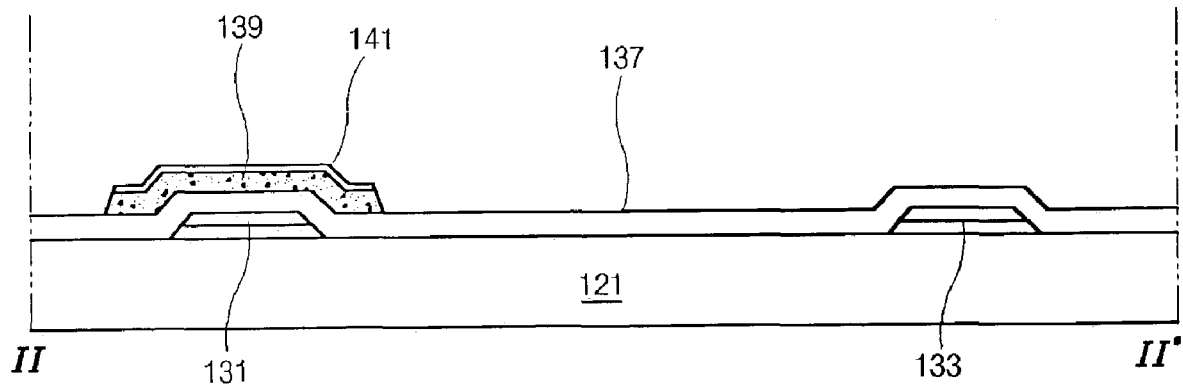
Figure 6E:
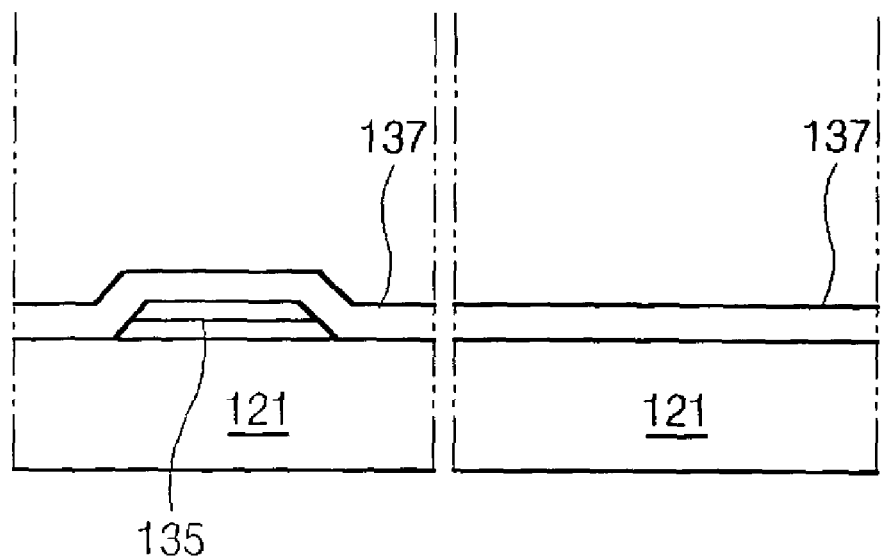

Now referring to FIGS. 5E and 6E, a gate insulation layer 137 is formed on the substrate 121 to cover the double-layered gate electrode 131, line 133 and pad electrode 135. The gate insulation layer 137 is an inorganic material, such as silicon nitride ($SiN_x$) or silicon oxide ($SiO_2$). Thereafter, amorphous silicon (a-Si:H) and n+ doped amorphous silicon (n+ a-Si:H) are sequentially formed on the gate insulation layer 137 and then patterned to form an active layer 139 and an ohmic contact layer 141 over the gate electrode 131.

Figure 5F:
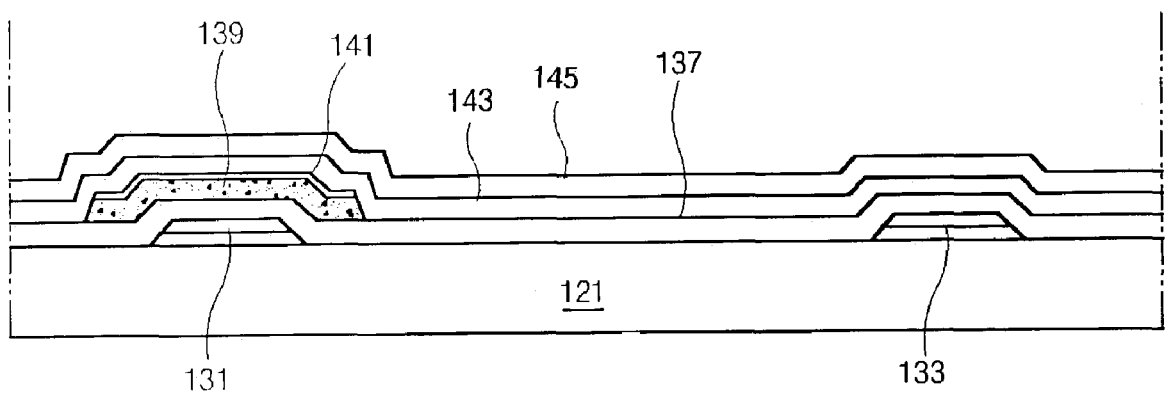
Figure 6F:
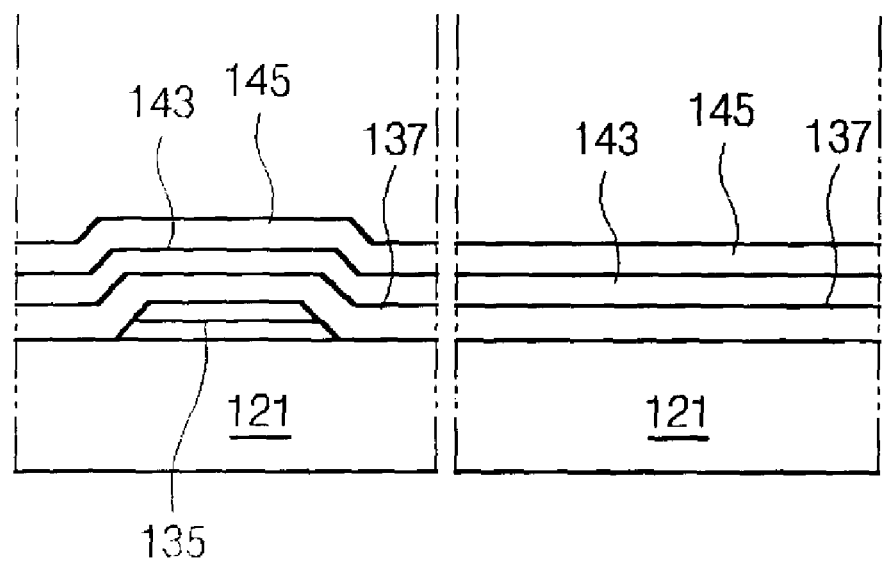

Next in FIGS. 5F and 6F, third and fourth metal layers 143 and 145 are sequentially formed on the gate insulation layer 137 to cover both the active layer 137 and the ohmic contact layer 141. Here, the third metal layer 143 may be one of tantalum (Ta), titanium (Ti), molybdenum (Mo), chromium (Cr), tungsten (W), nickel (Ni) and an alloy thereof. Further, the fourth metal layer 145 is copper (Cu). The third metal layer 143 acts as a barrier metal that is used to prevent the copper layer 145 from directly contacting the semiconductor layer of active layer 139 and of ohmic contact layer 141 because the copper layer 145 may react with the active layer 139 and the ohmic contact layer 141. Therefore, the double-layered structure of the barrier metal layer and the copper layer is disposed on the gate insulation layer 137.

Figure 5G:
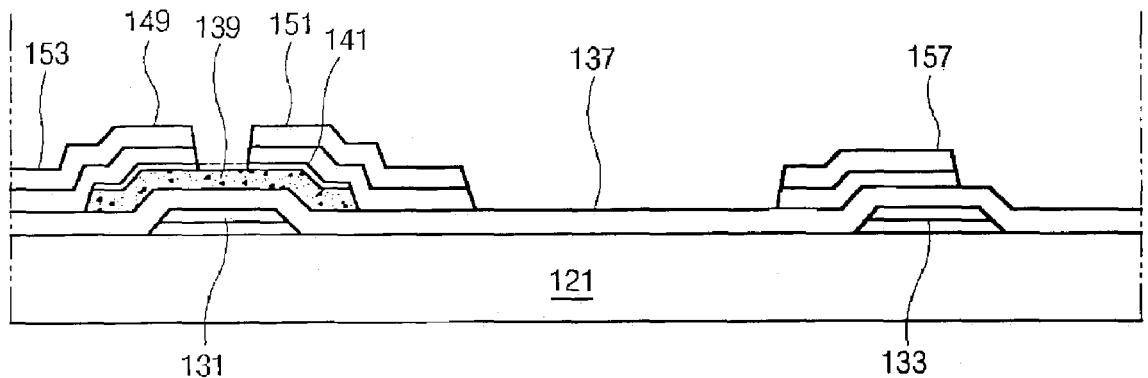
Figure 6G:
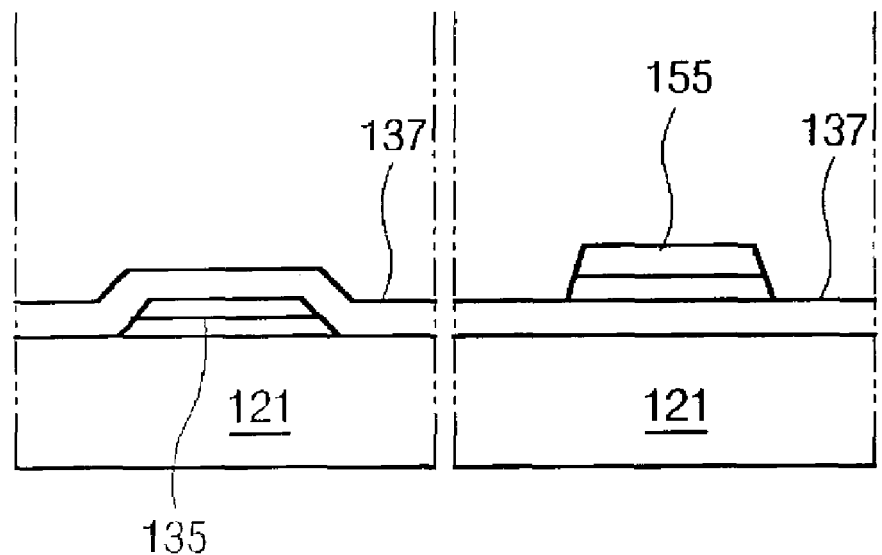

Thereafter, the third and fourth metal layers 143 and 145 are simultaneously patterned through a wet etch process. Thus, as shown in FIGS. 5G and 6G, a source electrode 149, a drain electrode 151, a data line 153, a data pad electrode 155 and a capacitor electrode 157, all of which have the double-layered structure, are formed over the substrate 121. The source electrode 149 extends from the data line 153 and contacts the ohmic contact layer 141. The drain electrode 151 is spaced apart from the source electrode 149 and also contacts the ohmic contact layer 141. As mentioned before, the data pad electrode 155 is at the end of the data line 153, and the capacitor electrode 157 is shaped like an island and disposed above the double-layered gate line 133. After forming the source and drain electrodes 149 and 151, a portion of the ohmic contact layer 141 between the source and drain electrodes 149 and 151 is removed to form a channel region.

Figure 5H:
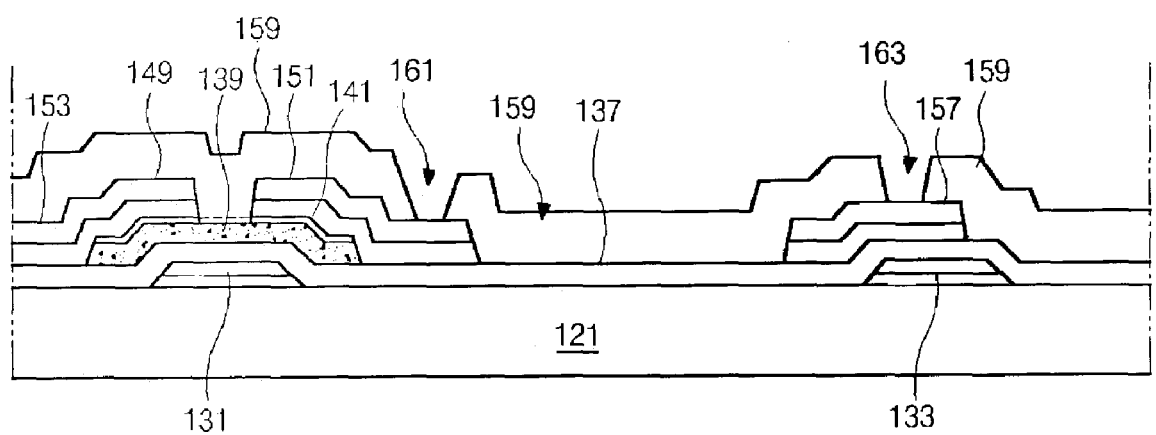
Figure 6H:
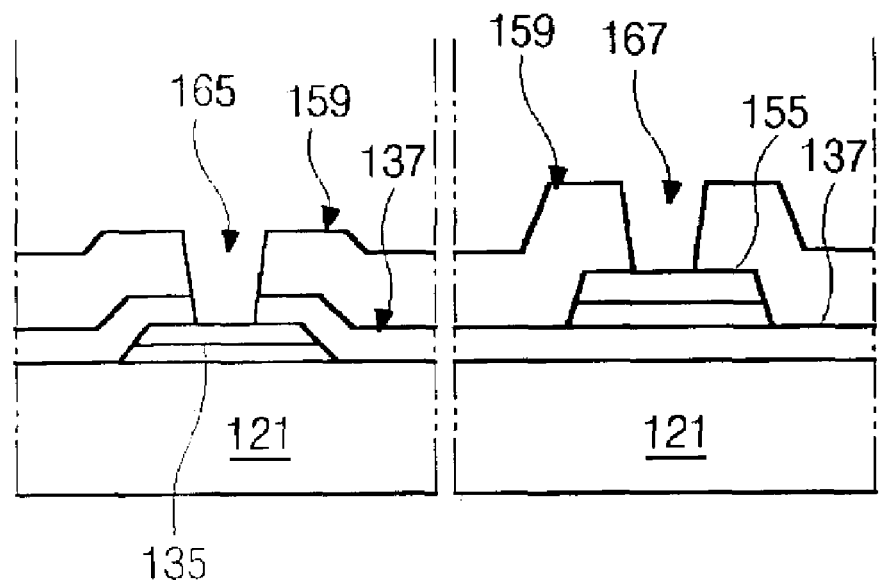

Now in FIGS. 5H and 6H, a passivation layer 159, which is an insulation material, is formed all over the substrate 121. The passivation layer 159 covers the source and drain electrodes 149 and 151, the data line 153, the data pad electrode 155 and the storage capacitor 157. By patterning the passivation layer 159, a drain contact hole 161, a storage contact hole 163, a gate pad contact hole 165, and a data pad contact hole 167 are formed. The drain contact hole 161 exposes a portion of the drain electrode 151, the storage contact hole 163 exposes a portion of the capacitor electrode 157, the gate pad contact hole 165 exposes a portion of the gate pad 135, and the data pad contact hole 167 exposes a portion of the data pad 155. An inorganic material, such as silicon oxide ($SiO_2$) or silicon nitride ($SiN_x$), or an organic material, such as benzocyclobutene (BCB) or acrylic resin, or double layers thereof may be used as a material for the passivation layer 159.

Figure 5I:
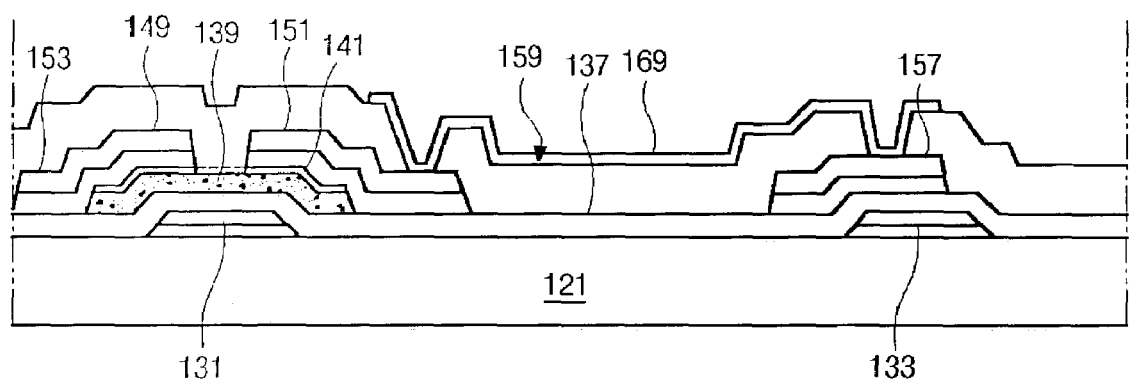
Figure 6I:
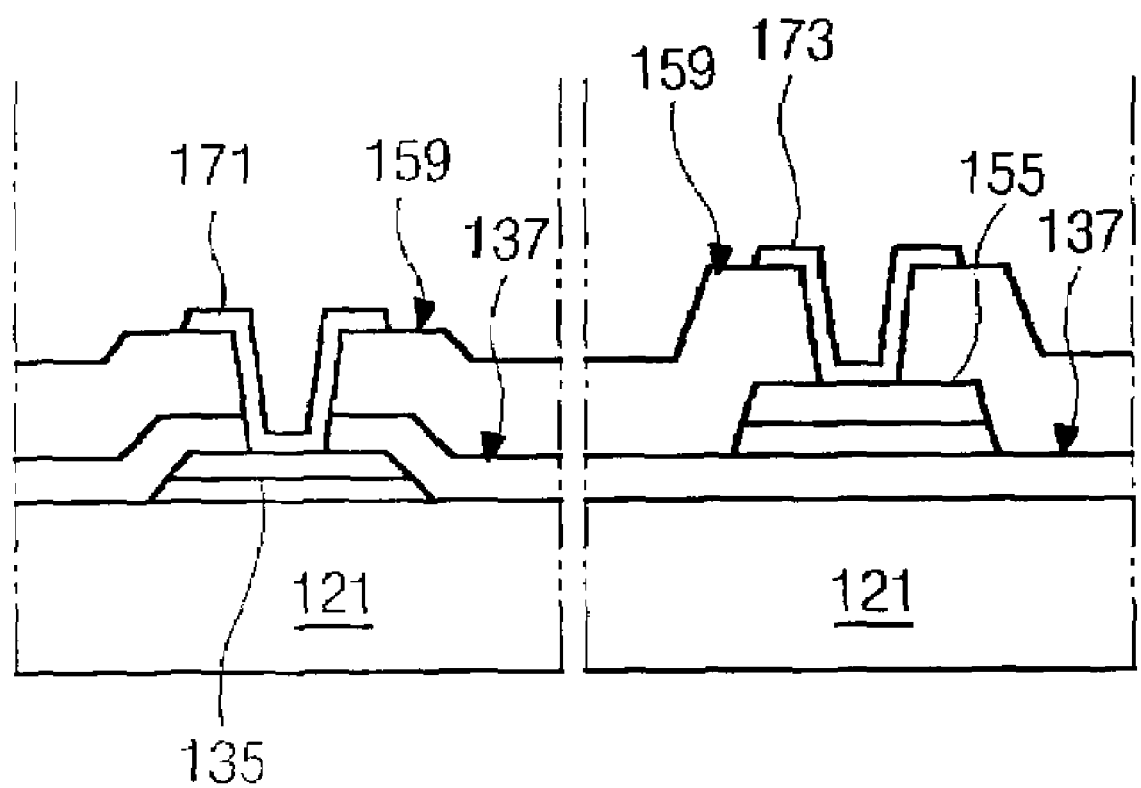

In FIGS. 5I and 6I, a transparent conductive material is deposited on the passivation layer 159 having the above-mentioned holes, and then patterned to form a pixel electrode 169, a gate pad terminal 171 and a data pad terminal 173. The transparent conductive material may be one of indium tin oxide (ITO) and indium zinc oxide (IZO). The pixel electrode 169 contacts the drain electrode 151 and the capacitor electrode 157, respectively, through the drain contact hole 161 and storage contact hole 163. Further, the gate pad terminal 171 contacts the gate pad 135 through the gate pad contact hole 165, and the data pad terminal 173 contacts the data pad 155 through the data pad contact hole 167. Accordingly, the array substrate of the present invention is complete.

In the above-mentioned present invention, since copper (Cu), which has a low resistance, is used for the gate electrode, the source and drain electrodes and the gate and data lines, the array substrate can have superior operating characteristics. For example, the thin film transistor can become a good array element in the array substrate. Furthermore, since the dry etch process is not required when forming the gate line and the gate electrode, it is possible to reduce the fabrication process time.

In the above-mentioned process, the double layers of the barrier metal and the copper layer are utilized. Namely, since the copper layer does not have a good contacting characteristic to the substrate and because the copper layer reacts with the semiconductor layer enough to produce the large leakage current, a barrier metal of tantalum (Ta), titanium (Ti), molybdenum (Mo), chromium (Cr), tungsten (W), nickel (Ni) or an alloy thereof is used underneath the copper layer.

Figure 7A:
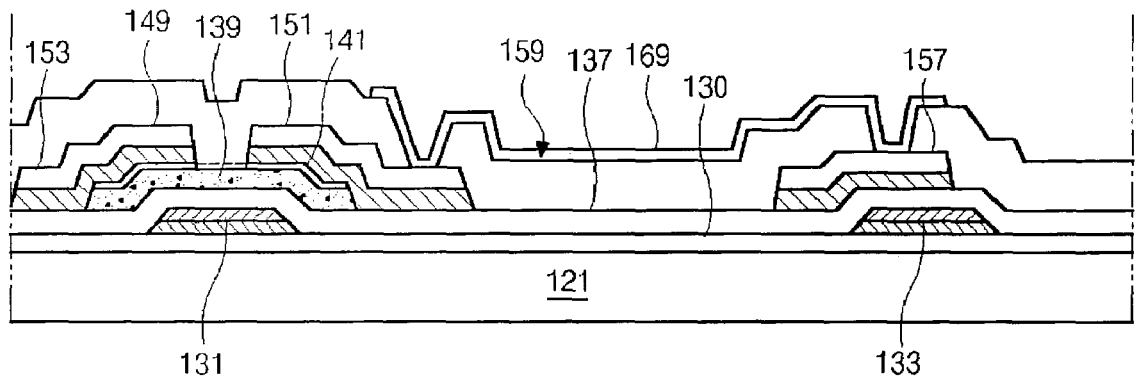
FIGS. 7A and 7B are cross-sectional views illustrating another exemplary embodiment of the present invention.
Figure 7B:
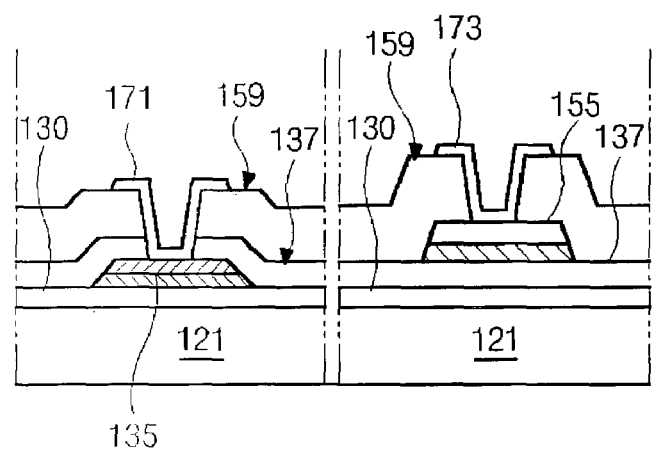

FIGS. 7A and 7B are cross-sectional views illustrating another exemplary embodiment of the present invention. As shown in FIGS. 7A and 7B, a buffer layer 130 is formed on the substrate 121. The buffer layer 130 may be an inorganic material, such as silicon nitride ($SiN_x$) or silicon oxide ($SiO_2$), or an organic material, such as benzocyclobutene (BCB) or acrylic resin, or double layers thereof. Thereafter, a gate electrode 131, a gate line 133 and a gate pad electrode 135 are formed on the buffer layer 130. The gate electrode 131, line 133 and pad electrode 135 have a double-layered structure consisting of a first metal of tantalum (Ta), titanium (Ti), molybdenum (Mo), chromium (Cr), tungsten (W), nickel (Ni) or an alloy thereof and a second metal of copper (Cu). As described hereinbefore, the gate electrode 131 extends from the gate line 133 and the gate pad electrode 135 is at the end of the gate line 133. In this embodiment of the present invention, the first and second metal layers are stably settled over the substrate 121 and firmly become the double layered gate electrode 131, line 133 and pad electrode 135 because the buffer layer 130 is formed between the substrate 121 and the first metal layer of tantalum (Ta), titanium (Ti), molybdenum (Mo), chromium (Cr), tungsten (W), nickel (Ni) or an alloy thereof.

After forming the double-layered gate electrode 131, line 133 and pad electrode 135, a gate insulation layer 137 is formed on the substrate 121 to cover the double-layered gate electrode 131, line 133 and pad electrode 135. As mentioned before, the gate insulation layer 137 may be an inorganic material, such as silicon nitride ($SiN_x$) or silicon oxide ($SiO_2$). Thereafter, an active layer 139 of amorphous (a-Si:H) and an ohmic contact layer 141 of n+ doped amorphous silicon (n+ a-Si:H) are sequentially formed on the gate insulation layer 137, especially over the gate electrode 131.

Next, a source electrode 149, a drain electrode 151, a data line 153, a data pad electrode 155 and a capacitor electrode 157, all of which have a double-layered structure, are formed over the substrate 121. The source electrode 149 extends from the data line 153 and contacts the ohmic contact layer 141. The drain electrode 151 is spaced apart from the source electrode 149 and also contacts the ohmic contact layer 141. As mentioned before, the data pad electrode 155 is at the end of the data line 153, and the capacitor electrode 157 is shaped like an island and disposed above the double-layered gate line 133. The first metal pattern of the source and drain electrodes 149 and 151, the data line 153, the data pad electrode 155 and the capacitor electrode 157 may be one of tantalum (Ta), titanium (Ti), molybdenum (Mo), chromium (Cr), tungsten (W), nickel (Ni) or an alloy thereof. Furthermore, the second metal pattern thereof is copper (Cu). After forming the source and drain electrodes 149 and 151, a portion of the ohmic contact layer 141 between the source and drain electrodes 149 and 151 is removed to form a channel region.

Still referring to FIGS. 7A and 7B, a passivation layer 159, which is an insulation material, is formed all over the substrate 121. The passivation layer 159 covers the source and drain electrodes 149 and 151, the data line 153, the data pad electrode 155 and the storage capacitor 157. As mentioned before, the passivation layer 159 has contact holes, which expose portions of the drain electrode 151, the capacitor electrode 157, the gate pad 135, and the data pad 155, respectively. As a material for the passivation layer 159, an inorganic material, such as silicon oxide ($SiO_2$) or silicon nitride ($SiN_x$), or an organic material, such as benzocyclobutene (BCB) or acrylic resin, or double layers thereof may be used.

After forming the passivation layer 159 having the contact holes, a transparent conductive material is deposited on the passivation layer 159, and then patterned to form a pixel electrode 169, a gate pad terminal 171 and a data pad terminal 173. The transparent conductive material is one of indium tin oxide (ITO) and indium zinc oxide (IZO). The pixel electrode 169 contacts the drain electrode 151 and the capacitor electrode 157, respectively, through the contact holes. Further, the gate pad terminal 171 contacts the gate pad 135, and the data pad terminal 173 contacts the data pad 155. Accordingly, the array substrate of the present invention is complete.

In the second exemplary embodiment of the present invention, since the buffer layer 130 is disposed on the substrate 121 before forming the double-layered gate, the double layered gate electrode 131, line 133 and pad electrode 135 can be stably formed over the substrate 121.

According to the present invention, the present invention has the following advantages. First, because both layers of the double-layered metal layer are simultaneously etched by the same etching solution, the fabrication process time can be reduced. Second, unlike the related art using aluminum, because the copper layer of the source and drain electrodes of the present invention do not contact the active layer, the thin film transistor can have improved characteristics. Third, because copper (Cu), which has a low resistance, is used for the lines and electrodes, the array substrate can be large in size without suffering from a signal delay such as that described with respect to of the related art.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An array substrate for use in a liquid crystal display device, comprising:
    a gate electrode, a gate line and a gate pad electrode on a substrate, wherein all of the gate electrode, the gate line and the gate pad electrode have a double-layered structure including a first barrier metal layer and a first copper layer, wherein the first barrier metal layer is interposed between the substrate and the first copper layer, wherein sides of the first copper layer are inside of sides of the first barrier metal layer and wherein the first barrier metal layer and the first copper layer have a smooth taper shape without any steps on their sides;
    a buffer layer between the substrate and the first barrier metal layer, wherein the buffer layer is a double layer;
    a gate insulation layer on the substrate covering the double-layered gate electrode, gate line and gate pad;
    an active layer and an ohmic contact layer sequentially formed on the gate insulation layer and over the gate electrode;
    a data line on the gate insulation layer crossing the gate line, source and drain electrodes contacting the ohmic contact layer, and a data pad electrode on the gate insulation layer, wherein all of the data line, the source and drain electrodes, and the data pad electrode have a double-layered structure including a second barrier metal layer and a second copper layer, wherein the second barrier metal layer is interposed between the substrate and the second copper layer, wherein each of the first and second barrier metal layers includes a metallic material that has a good adhesive characteristic to the substrate and prevents a reaction between the second copper layer and both the active layer and the ohmic contact layer, and wherein the metallic material is one of tantalum (Ta) and titanium (Ti);
    a passivation layer formed on the gate insulation layer to cover the double-layered data line, source and drain electrodes, and data pad electrode, wherein the passivation layer has a drain contact hole exposing the drain electrode, a gate pad contact hole exposing the gate pad electrode, and a data pad contact hole exposing the data pad; and a pixel electrode, a gate pad terminal and a data pad terminal all of which are formed of a transparent conductive material on the passivation layer.

2. The array substrate according to claim 1, wherein the gate electrode extends from the gate line and the gate pad electrode is at an end of the gate line.

3. The array substrate according to claim 1, wherein the source electrode extends from the data line, wherein the drain electrode is spaced apart from the source electrode, and wherein the data pad electrode is at an end of the data line.

4. The array substrate according to claim 1, wherein the pixel electrode is disposed in a pixel region defined by the crossing of the gate and data lines, wherein said pixel electrode contacts the drain electrode through the drain contact hole, wherein the gate pad terminal contacts the gate pad through the gate pad contact hole, and wherein the data pad terminal contacts the data pad through the data pad contact hole.

5. The array substrate according to claim 1, further comprising a storage capacitor comprising:
   a portion of the gate line;
   the gate insulating layer as a dielectric layer; and
   a double-layered capacitor electrode on the gate insulating layer and over the portion of the gate line;
   wherein the double-layered capacitor electrode has the second barrier metal layer and the second copper layer.

6. The array substrate according to claim 5, wherein the double-layered capacitor electrode is connected in parallel with the pixel electrode through a contact hole formed in the passivation layer.

7. The array substrate according to claim 1, wherein the gate insulation layer is an inorganic material selected from a group consisting of silicon nitride and silicon oxide.

8. The array substrate according to claim 1, wherein the passivation layer is one of silicon nitride, silicon oxide, benzocyclobutene (BCB), acrylic resin, and double layers thereof.

9. The array substrate according to claim 1, wherein the double layer includes two of silicon nitride, silicon oxide, benzocyclobutene (BCB) and acrylic resin.

10. The array substrate according to claim 1, wherein the metallic material has a good adhesive characteristic to the buffer layer.

11. A method of forming an array substrate for use in a liquid crystal display device, comprising:
   forming a gate electrode, a gate line and a gate pad electrode on a substrate, wherein all of the gate electrode, the gate line and the gate pad electrode have a double-layered structure including a first barrier metal layer and a first copper layer, wherein the first barrier metal layer is interposed between the substrate and the first copper layer, wherein sides of the first copper layer are inside of sides of the first barrier metal layer, and wherein the first barrier metal layer and the first copper layer have a smooth taper shape without any steps on their sides;
   forming a buffer layer between the substrate and the first barrier metal layer, wherein the buffer layer is a double layer;
   forming a gate insulation layer on the substrate to cover the double-layered gate electrode, gate line and gate pad;
   forming an active layer and an ohmic contact layer sequentially on the gate insulation layer and over the gate electrode;
   forming a data line, source and drain electrodes and a data pad electrode, wherein the data line is on the gate insulation layer and crossed the gate line, wherein the source and drain electrodes contact the ohmic contact layer, wherein the data pad electrode is disposed on the gate insulation layer, wherein all of the data line, the source and drain electrodes, the capacitor electrode and the data pad electrode have a double-layered structure including a second barrier metal layer and a second copper layer, wherein the second barrier metal layer and the second copper layer of each of the data line, the source and drain electrodes, the capacitor electrode and the data pad electrode are simultaneously etched by a same etching solution, wherein the second barrier metal layer is interposed between the substrate and the second copper layer, wherein each of the first and second barrier metal layers includes a metallic material that has a good adhesive characteristic to the substrate and prevents a reaction between the second copper layer and both the active layer and the ohmic contact layer, and wherein the metallic material is any of tantalum (Ta) and titanium (Ti);
   forming a passivation layer formed on the gate insulation layer to cover the double-layered data line, source and drain electrodes, and data pad electrode, wherein the passivation layer has a drain contact hole exposing the drain electrode, a gate pad contact hole exposing the gate pad electrode, and a data pad contact hole exposing the data pad; and
   forming a pixel electrode, a gate pad terminal and a data pad terminal on the passivation layer using a transparent conductive material.

12. The method according to claim 11, wherein the gate electrode extends from the gate line and the gate pad electrode is at the end of the gate line.

13. The method according to claim 11, wherein the source electrode extends from the data line, wherein the drain electrode is spaced apart from the source electrode, and wherein the data pad electrode is at the end of the data line.

14. The method according to claim 11, wherein the pixel electrode is disposed in a pixel region defined by the crossing of the gate and data lines and contacts the drain electrode through the drain contact hole, wherein the gate pad terminal contacts the gate pad through the gate pad contact hole, and wherein the data pad terminal contacts the data pad through the data pad contact hole.

15. The method according to claim 11, wherein forming a data line, source and drain electrodes and a data pad electrode includes forming a double-layered capacitor electrode on the gate insulating layer and over the portion of the gate line, wherein the double-layered capacitor electrode has the second barrier metal layer and the second copper layer.

16. The method according to claim 15, wherein the double-layered capacitor electrode is connected in parallel with the pixel electrode through a contact hole that formed in the passivation layer.

17. The method according to claim 11, wherein the gate insulation layer is an inorganic material selected from a group consisting of silicon nitride and silicon oxide.

18. The method according to claim 11, wherein the passivation layer is one of silicon nitride, silicon oxide, benzocyclobutene (BCB), acrylic resin, or double layers thereof.

19. The method according to claim 11, wherein the double layer includes two of silicon nitride, silicon oxide, benzocyclobutene (BCB) and acrylic resin.

20. The method according to claim 11, wherein the metallic material has a good adhesive characteristic to the buffer layer.

21. The method according to claim 11, wherein the first barrier metal layer and the first copper layer of each of the gate electrode, the gate line and the gate pad electrode are simultaneously etched by a same etching solution.

* * * * *